(12) United States Patent
Berman et al.

(10) Patent No.: US 11,759,041 B2
(45) Date of Patent: *Sep. 19, 2023

(54) SELF-TAPPING BRACKETS

(71) Applicant: House of Atlas, LLC, Evanston, IL (US)

(72) Inventors: Matthew Berman, Chicago, IL (US); Alan Arthur Ford, Sturgis, MI (US); Jason Moss, Libertyville, IL (US); Young Min Bae, Evanston, IL (US)

(73) Assignee: House of Atlas, LLC, Evanston, IL (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/871,859

(22) Filed: May 11, 2020

(65) Prior Publication Data

US 2021/0345808 A1 Nov. 11, 2021

(51) Int. Cl.
*A47H 1/142* (2006.01)
*F16B 13/04* (2006.01)

(52) U.S. Cl.
CPC ............ *A47H 1/142* (2013.01); *F16B 13/04* (2013.01)

(58) Field of Classification Search
CPC ............ A47H 1/142; A47H 1/14; F16B 13/04
USPC ................ 248/256, 257, 259, 260, 265, 254
See application file for complete search history.

(56) References Cited

U.S. PATENT DOCUMENTS

| | | | |
|---|---|---|---|
| 241,991 A | 5/1881 | Jones | |
| 331,850 A | 12/1885 | Umstadter | |
| 568,048 A * | 9/1896 | Starbuck | A47H 1/122 248/265 |
| 639,439 A * | 12/1899 | Rush | A47H 1/13 248/257 |
| 690,437 A * | 1/1902 | Jolliffe | A47H 1/13 248/257 |
| 762,594 A | 6/1904 | Michaels | |
| 819,362 A * | 5/1906 | Miller | A47H 1/13 248/254 |
| 832,061 A * | 10/1906 | Hooper | A47H 1/13 248/257 |
| 881,672 A * | 3/1908 | Ebenhoch | A47H 1/122 248/265 |
| 887,647 A * | 5/1908 | Johnston | A47H 1/13 248/259 |

(Continued)

OTHER PUBLICATIONS

Design U.S. Appl. No. 29/778,757, filed Apr. 14, 2021, "Fork Mount", 27 pages.

(Continued)

*Primary Examiner* — Kimberly T Wood

(74) *Attorney, Agent, or Firm* — Fitch Even Tabin & Flannery LLP

(57) ABSTRACT

There is a self-tapping curtain rod bracket with spaced prongs terminating with tips. The tips and prongs are used to penetrate and create holes in a wall. They extend through the holes and engage the backside of the wall. A wall support extends from the spaced prongs along the frontside of the wall to provide support. An arm extends away from the wall and has a cradle to support a curtain rod. The wall support also has an arm support, and the spaced prongs also includes a mount support. The mount support being located between the arm support and the arm.

12 Claims, 35 Drawing Sheets

(56) References Cited

U.S. PATENT DOCUMENTS

| | | | |
|---|---|---|---|
| 895,665 A * | 8/1908 | McMichael | A47H 1/13 248/254 |
| 904,920 A * | 11/1908 | Bantly | A47H 1/13 248/259 |
| 919,988 A * | 4/1909 | Witzal | A47H 1/13 248/254 |
| 925,829 A * | 6/1909 | Ramminger | A47H 1/13 248/259 |
| 934,113 A * | 9/1909 | Eckert | G02C 5/12 351/75 |
| 1,035,626 A * | 8/1912 | Moore | A47H 1/13 248/257 |
| 1,080,370 A * | 12/1913 | Scheiding | A47H 1/13 248/259 |
| 1,115,997 A | 11/1914 | Withrow | |
| 1,147,355 A * | 7/1915 | Zevin | A47H 1/13 248/257 |
| 1,187,366 A | 6/1916 | Mozroll | |
| 1,250,846 A * | 12/1917 | Gessner | A47H 1/13 248/257 |
| 1,265,044 A * | 5/1918 | Buuederly | A47H 1/13 248/258 |
| 1,275,475 A * | 8/1918 | Rorick | A47H 1/13 248/256 |
| 1,332,247 A * | 3/1920 | Cranford | A47H 1/13 248/259 |
| 1,333,163 A | 3/1920 | Eddy | |
| 1,346,749 A * | 7/1920 | Henson | E06B 9/50 248/254 |
| 1,384,246 A | 7/1921 | Durnell | |
| 1,445,372 A | 2/1923 | Wagner | |
| 1,451,764 A | 4/1923 | Dick | |
| 1,492,210 A | 4/1924 | Kelly | |
| 1,559,081 A * | 10/1925 | Fischer | A47H 1/13 248/259 |
| 1,805,784 A * | 5/1931 | Peterson | A47H 1/142 248/254 |
| 2,240,225 A | 4/1941 | Place | |
| 2,386,854 A | 10/1945 | Hilton | |
| 2,789,783 A | 4/1957 | Jones | |
| 3,095,033 A * | 6/1963 | Polkosnik | A47H 1/122 160/345 |
| 3,199,823 A * | 8/1965 | Stall | A47H 1/122 248/265 |
| 3,219,302 A | 11/1965 | Smith | |
| 3,284,041 A | 11/1966 | Tjaden | |
| 3,289,992 A | 12/1966 | Brooks | |
| 3,312,442 A | 4/1967 | Moeller | |
| 3,614,045 A | 10/1971 | Cegielski, Jr. | |
| 3,704,851 A * | 12/1972 | Cormier | A47H 1/10 248/265 |
| 3,778,955 A | 12/1973 | Close | |
| 4,039,136 A | 8/1977 | DeHart | |
| 4,140,294 A * | 2/1979 | Zwarts | A47H 1/122 248/265 |
| D265,285 S | 7/1982 | Englert | |
| 4,509,713 A * | 4/1985 | Hogg | F16B 15/00 248/217.4 |
| D290,224 S | 6/1987 | Skinner | |
| D290,931 S | 7/1987 | Powell | |
| 4,708,311 A | 11/1987 | Clausen | |
| D307,686 S | 5/1990 | Cadman | |
| D310,018 S | 8/1990 | Landrum | |
| D312,960 S | 12/1990 | Embree | |
| D315,862 S | 4/1991 | Specker, Jr. | |
| 5,028,030 A | 7/1991 | Lewis | |
| 5,054,728 A | 10/1991 | Nigro, Jr. | |
| D329,372 S | 9/1992 | Wilms | |
| D335,935 S | 5/1993 | Rouail | |
| 5,582,303 A | 12/1996 | Sloan | |
| D389,035 S | 1/1998 | Smiley | |
| 5,996,791 A | 12/1999 | Bibby | |
| 6,371,427 B1 * | 4/2002 | Johnson | A47G 1/20 248/303 |
| D459,978 S | 7/2002 | Hollinger | |
| 6,481,584 B1 | 11/2002 | Cantley | |
| 6,695,276 B2 | 2/2004 | Skorka | |
| 7,448,507 B1 | 11/2008 | Abernathy, Jr. | |
| D602,344 S | 10/2009 | Olien | |
| D605,931 S | 12/2009 | Piersant | |
| 8,056,873 B1 | 11/2011 | Hanely | |
| 8,356,782 B2 | 1/2013 | Robichaud | |
| D678,754 S | 3/2013 | Burr | |
| 8,418,975 B1 | 4/2013 | Burr | |
| D707,535 S | 6/2014 | Burr | |
| 8,844,886 B2 | 9/2014 | Mejia | |
| 8,851,435 B1 | 10/2014 | Bastien | |
| 9,486,913 B2 | 11/2016 | Thieman | |
| 9,532,663 B2 | 1/2017 | Nilsson | |
| 9,609,974 B2 | 4/2017 | Mateer | |
| D811,205 S | 2/2018 | Hanley | |
| D813,021 S | 3/2018 | Hanley | |
| D813,022 S | 3/2018 | Hanley | |
| D822,464 S | 7/2018 | Kwiatkowski | |
| 10,070,748 B2 | 9/2018 | Hanley | |
| 10,092,126 B2 | 10/2018 | Baines | |
| D834,925 S | 12/2018 | Hanley | |
| D834,926 S | 12/2018 | Hanley | |
| D834,927 S | 12/2018 | Hanley | |
| D847,613 S | 5/2019 | Hanley | |
| 10,278,529 B2 | 5/2019 | Baines | |
| D856,785 S | 8/2019 | Hanley | |
| 10,376,086 B1 | 8/2019 | Mustafa | |
| D858,259 S | 9/2019 | Hanley | |
| D858,260 S | 9/2019 | Hanley | |
| D859,963 S | 9/2019 | Hanley | |
| 10,542,835 B1 | 1/2020 | Suozzo | |
| 10,648,492 B2 | 5/2020 | Hanley | |
| D893,284 S | 8/2020 | Hanley | |
| 11,002,302 B2 | 5/2021 | Hanley | |
| D957,237 S | 7/2022 | Zhang | |
| 11,452,398 B2 * | 9/2022 | Berman | A47H 1/142 |
| D966,871 S | 10/2022 | Wang | |
| 2003/0071181 A1 | 4/2003 | Valiulis | |
| 2004/0159766 A1 | 8/2004 | Skorka | |
| 2005/0218284 A1 | 10/2005 | Kurrasch | |
| 2012/0001039 A1 | 1/2012 | Mcduff | |
| 2015/0265086 A1 | 9/2015 | Hanley | |
| 2016/0215922 A1 | 7/2016 | Mcduff | |
| 2018/0014680 A1 | 1/2018 | Hanley | |
| 2018/0064279 A1 | 3/2018 | Hanley | |
| 2018/0098656 A1 | 4/2018 | Baines | |
| 2018/0306219 A1 | 10/2018 | Hanley | |
| 2019/0063671 A1 | 2/2019 | Mcduff | |
| 2019/0099034 A1 | 4/2019 | Hanley | |
| 2019/0282017 A1 | 9/2019 | Hanley | |
| 2020/0200199 A1 | 6/2020 | Hanley | |

OTHER PUBLICATIONS

Design U.S. Appl. No. 29/778,758, filed Apr. 14, 2021, "Rod Support Arm," 8 pages.
Amazon, 2Pcs Leaf blower Hanger for Garage, Leaf Blower Rack, published Dec. 24, 2021 [retrieved Nov. 25, 2022]. Retrieved from the internet<https://www.amazon.com/dp/B091Y314KH>, 2 pages.
Amazon, Mount double hook, heavy steel garage storage, published Sep. 13, 2018 [retrieved Nov. 25, 2022]. Retrieved from the internet <https://www.amazon.com/dp/B07 H BWS P61>, 4 pages.

* cited by examiner

SELF-TAPPING BRACKETS

FIELD

The subject matter relates to brackets and, more particularly, to curtain rod brackets that can be mounted without the use of tools.

BACKGROUND

Curtain rod brackets can be difficult to install, often requiring the assistance of professional installers. Most curtain rod brackets are installed with screws and in some cases nails and, therefore, installation requires the use of tools. There is a desire to make installation of curtain rod brackets easier so that a do-it-yourselfer can perform the installation without the need for tools.

Others have developed curtain rods that are installed without hardware, but these have much more limited use. For example, tension rods do not require tools for installation, but their use is limited to situations where there are opposing surfaces or walls, such as window frames, closets or bathroom tub and shower enclosures. Magnetic systems do not require tools for installation, but their use is limited to situations where there is a metal surface, such as a steel frame, and are further limited by the amount of weight that can be supported. Suction cup systems do not require tools for installation, but suction cups are limited by the amount of weight they can support.

Thus, there is a need for curtain rod systems that do not require tools and that are not limited by the weight that they can support so that heavy drapery material can be used in the interior design.

Figure 9A:
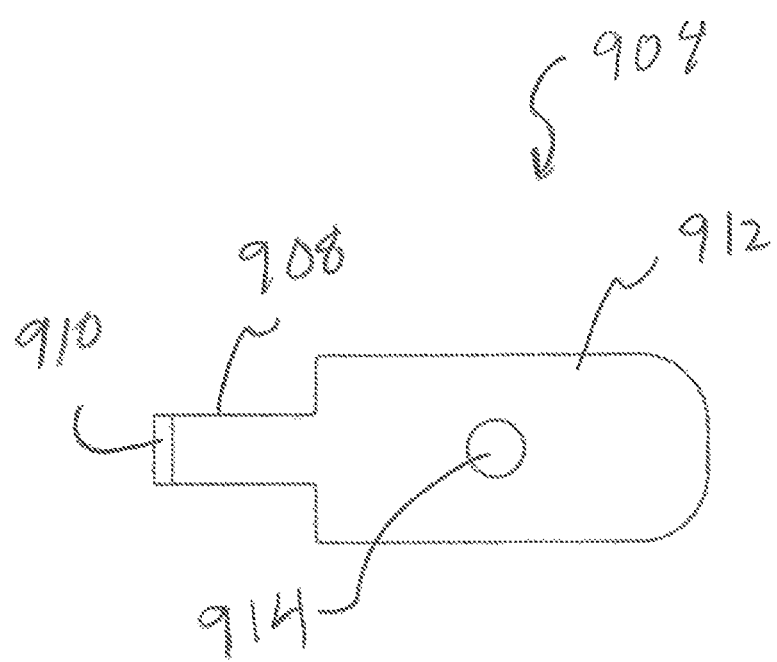
FIG. 9A is a top plan view of a single prong mount portion.
Figure 9B:
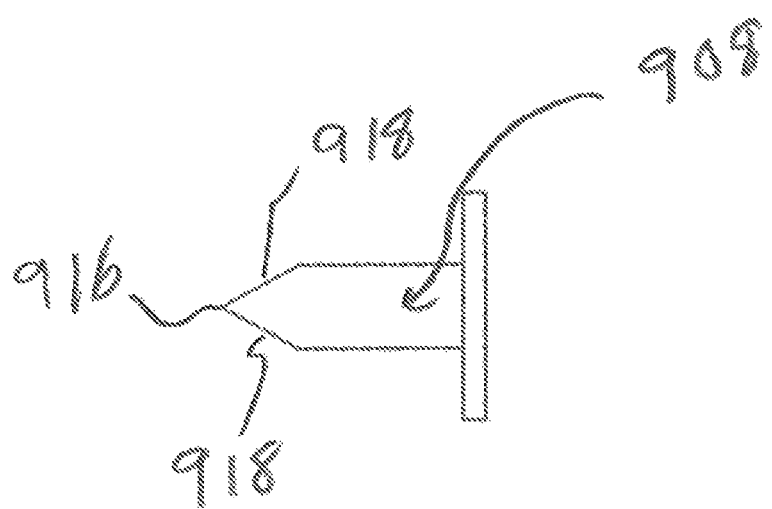
Figure 9C:
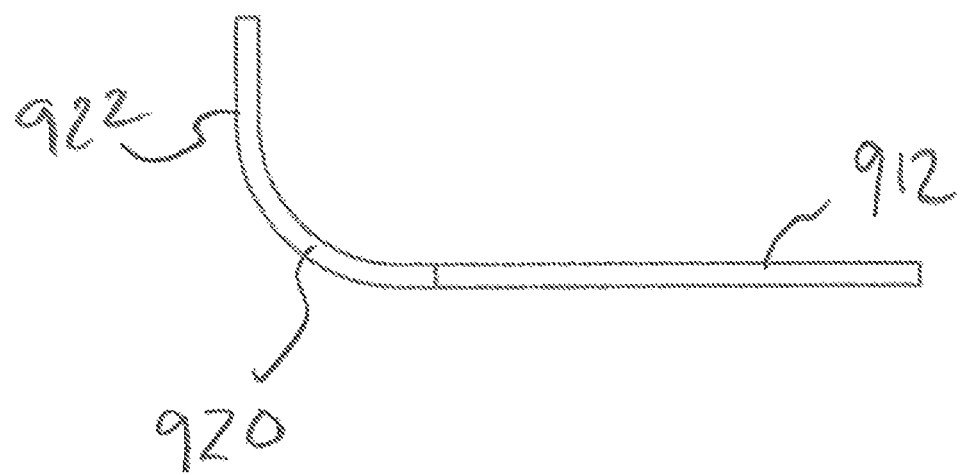
Figure 10A:
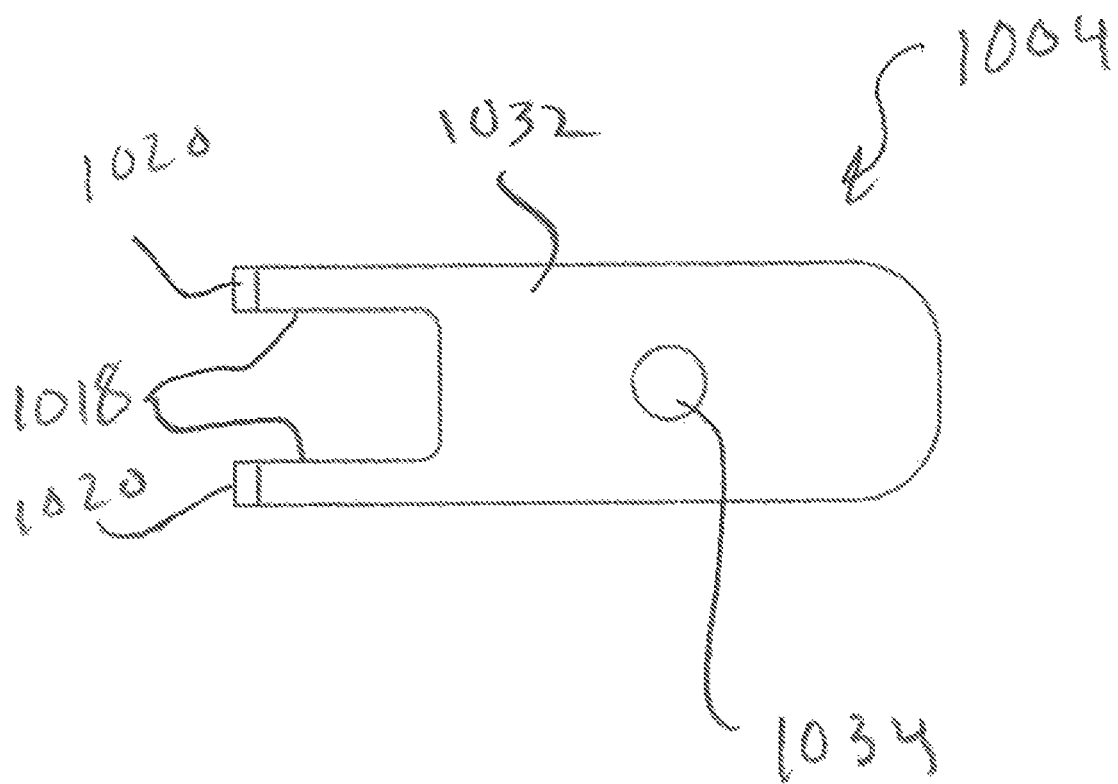
Figure 10B:
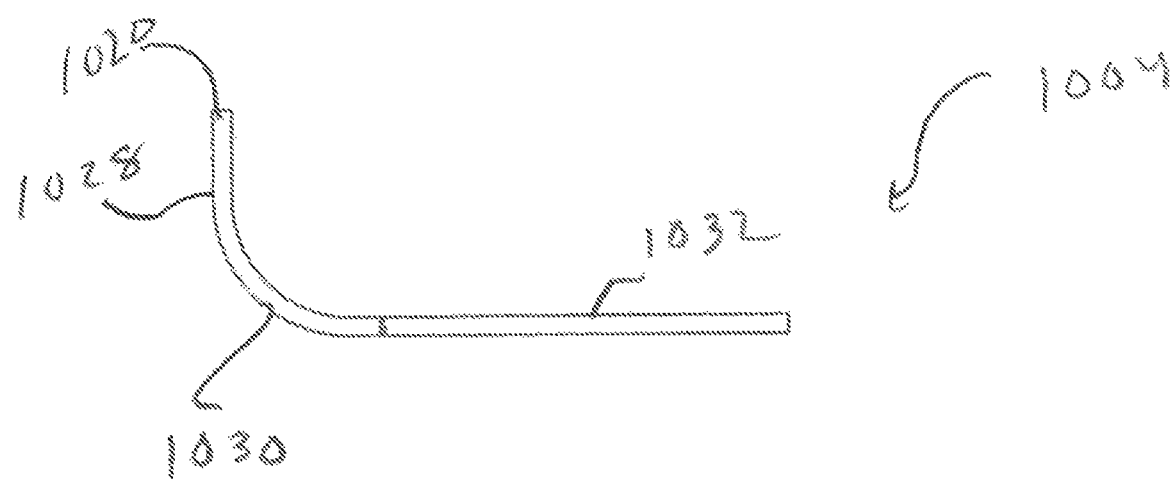

FIB. 9B is an end elevation view of the single prong mount portion of FIG. 9A;

FIG. 9C is a side elevation view of the single prong mount portion of FIG. 9A;

FIG. 10A is a top plan view of an alternative prong mount;

FIG. 10B is a side elevation view of the prong mount of FIG. 10A; and

Figure 10C:
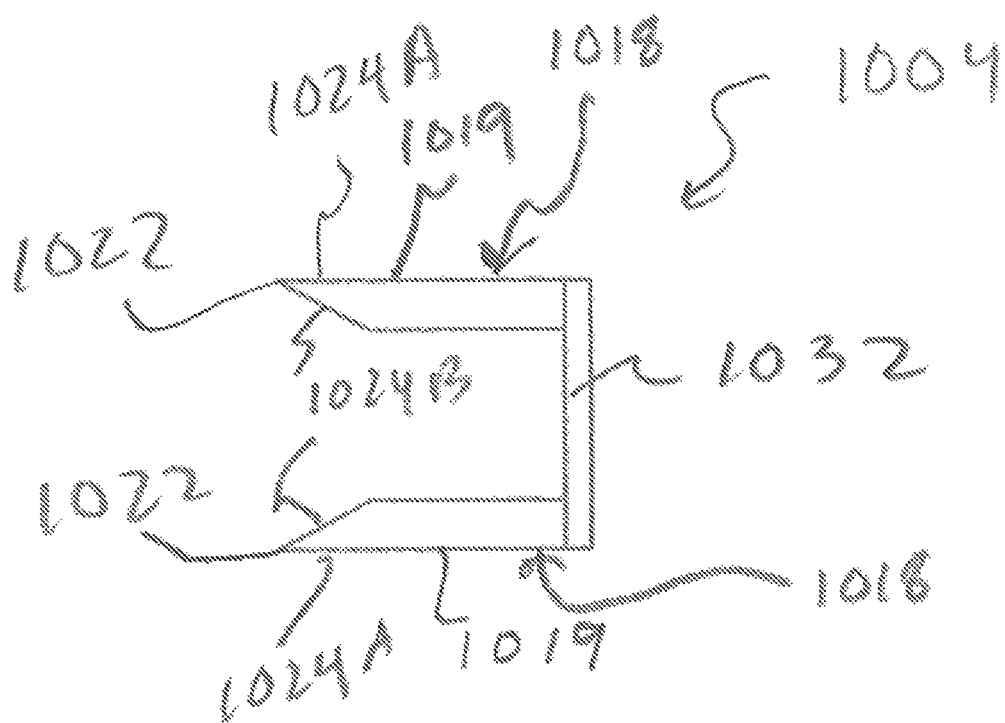

FIG. 10C is a front elevation view of the prong mount of FIG. 10A.

DETAILED DESCRIPTION

Figure 1A:
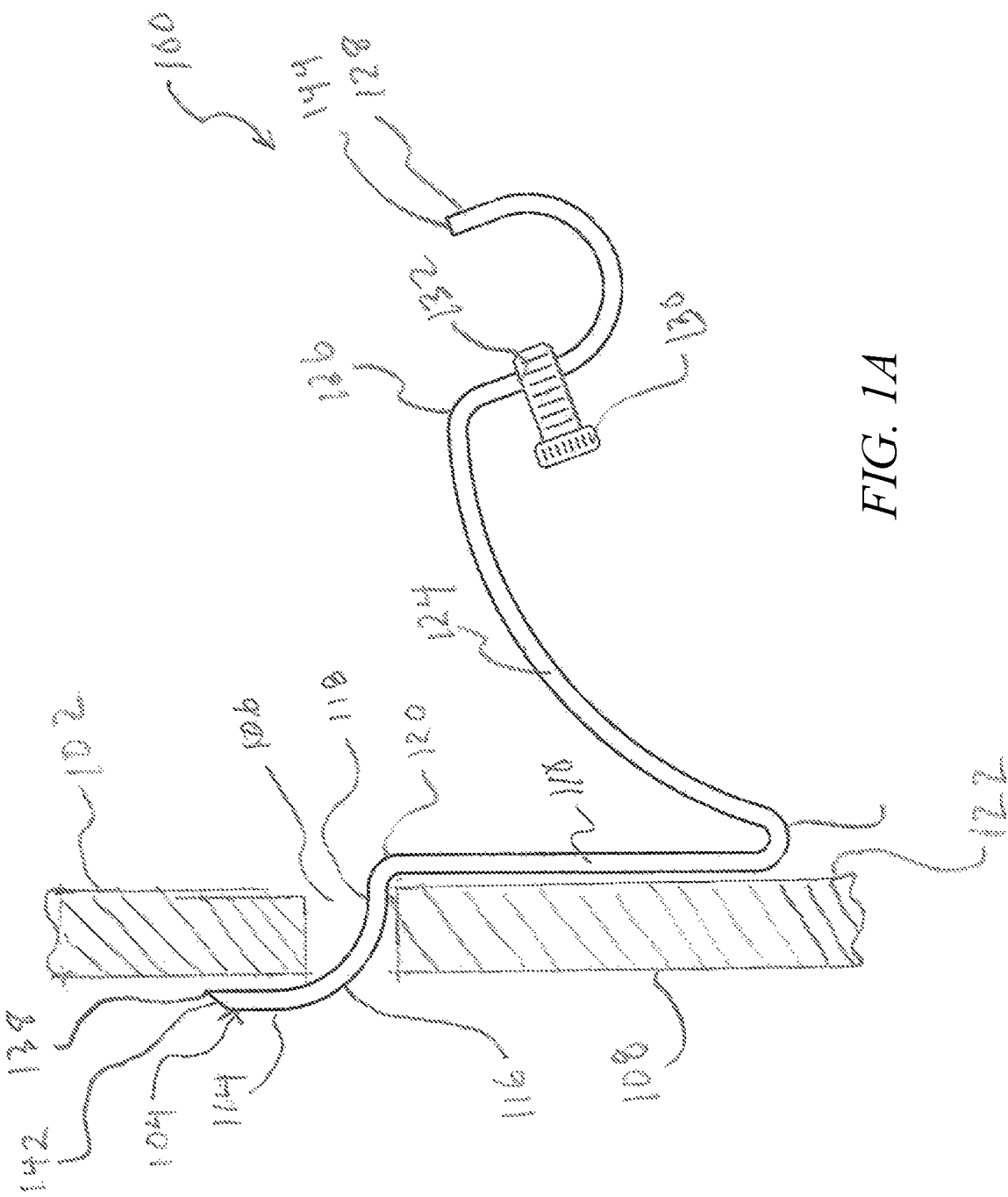
FIG. 1A is a left side elevation view of a single piece rod bracket.
Figure 1B:
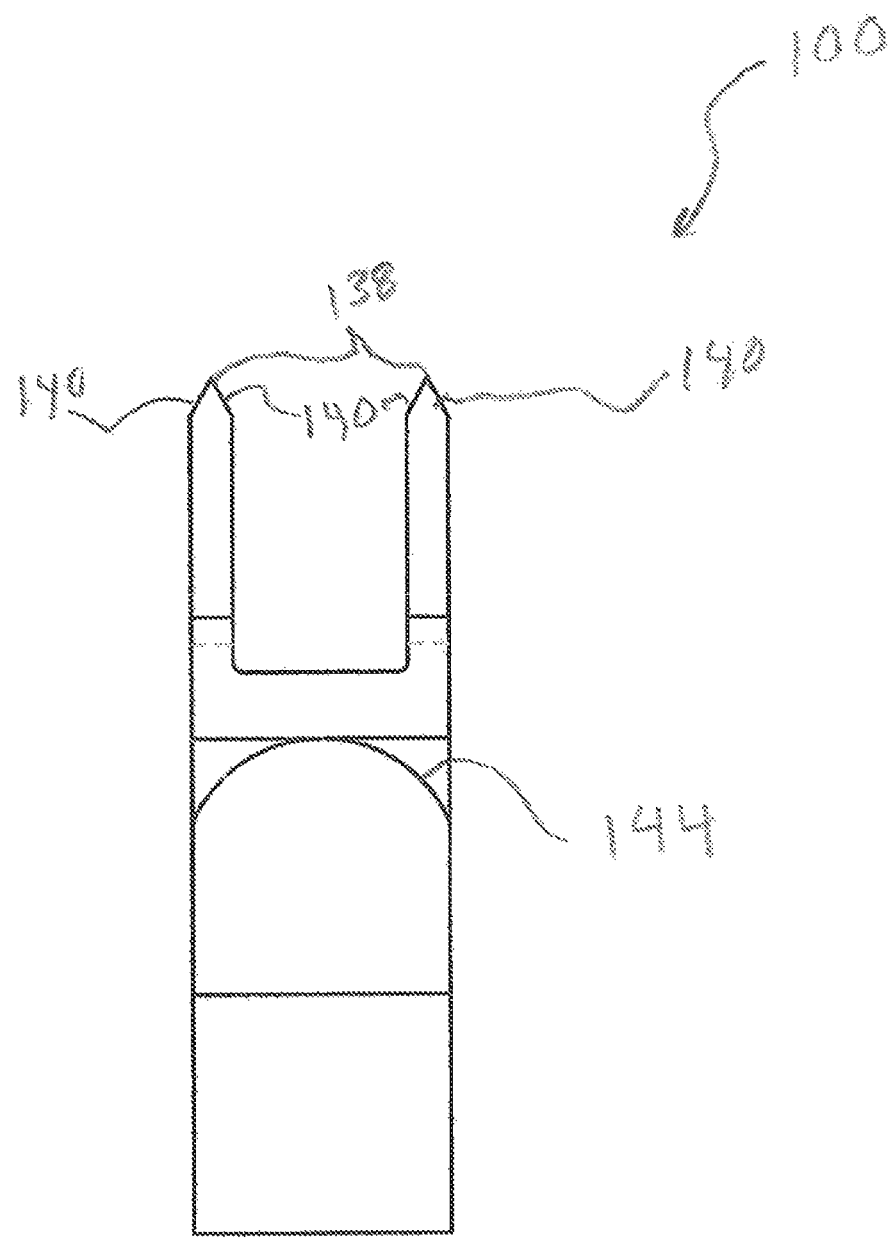
FIG. 1B is a front elevation view of the single piece rod bracket of FIG. 1A.
Figure 1C:
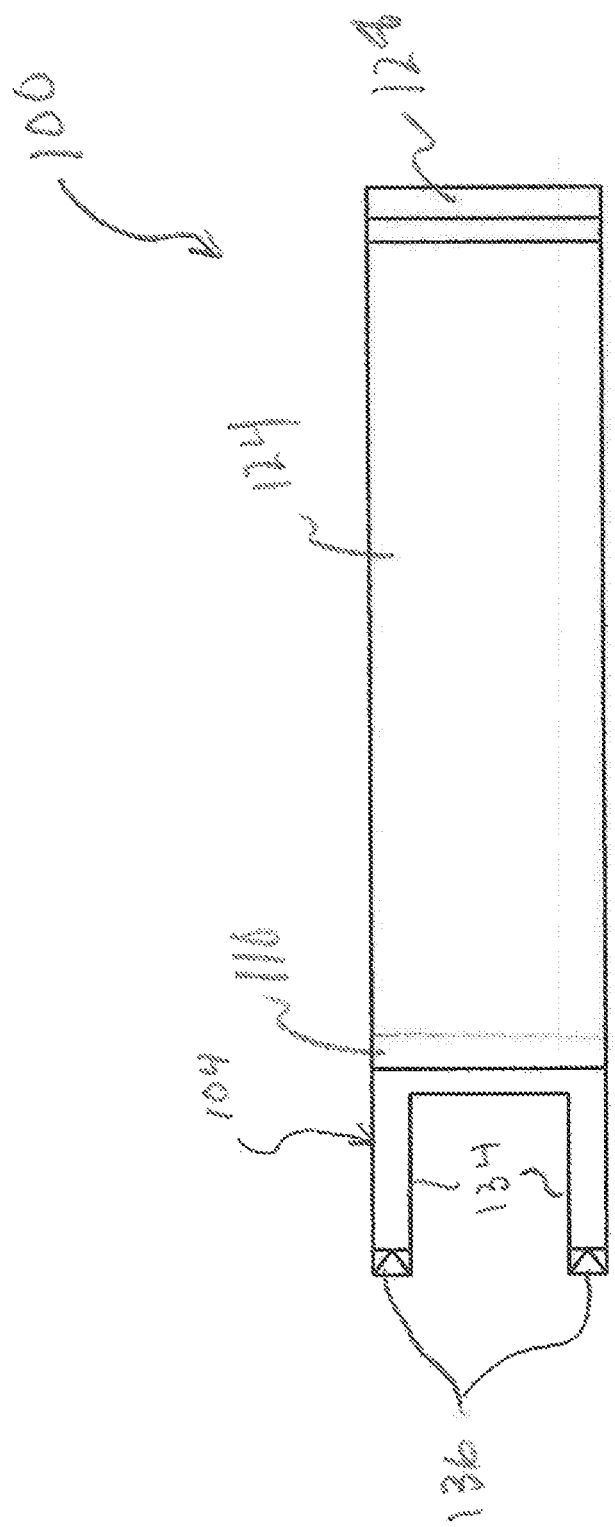
FIG. 1C is a top plan view of the single piece rod bracket of FIG. 1A.
Figure 2A:
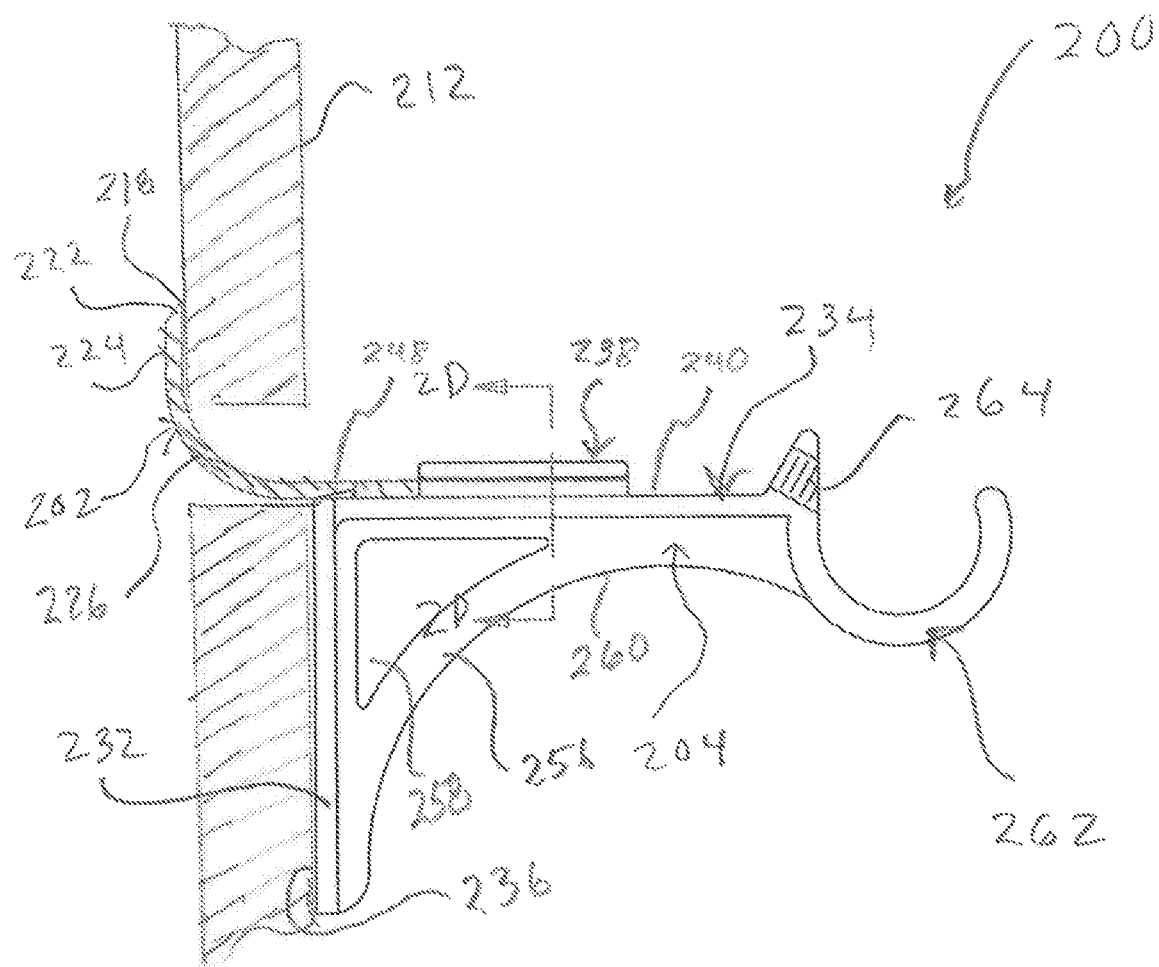
FIG. 2A is a left side elevation view of a two-piece rod bracket.
Figure 2B:
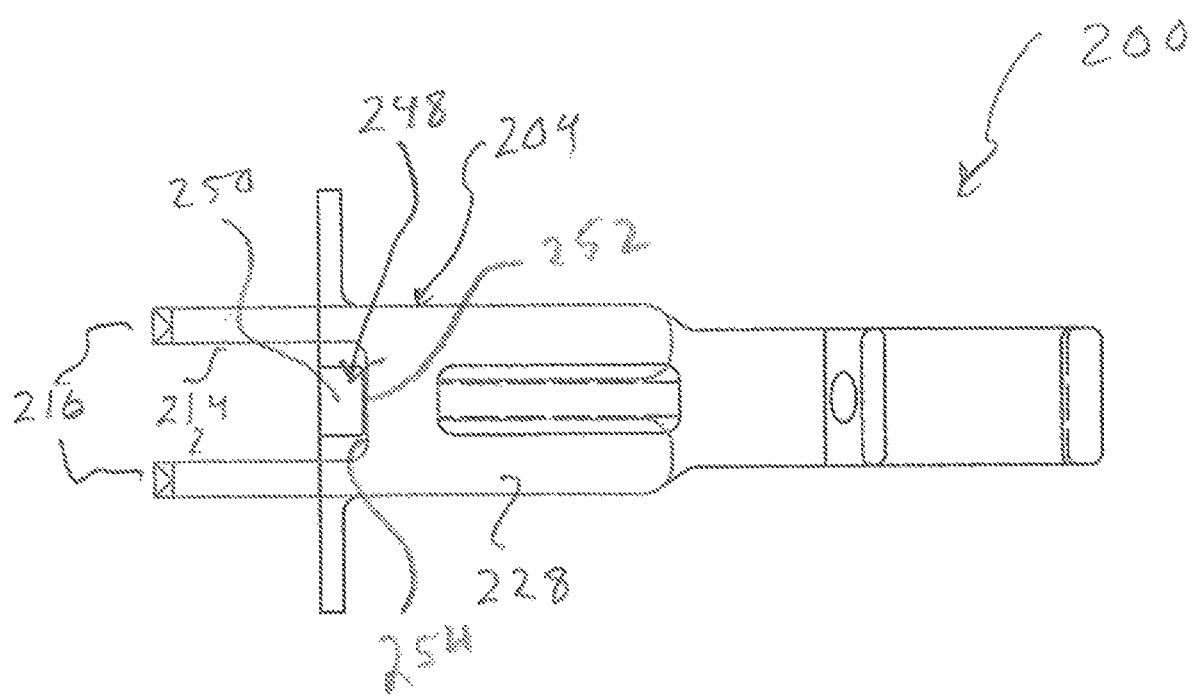
FIG. 2B is a top plan view of the two-piece rod bracket of FIG. 2A.
Figure 2C:
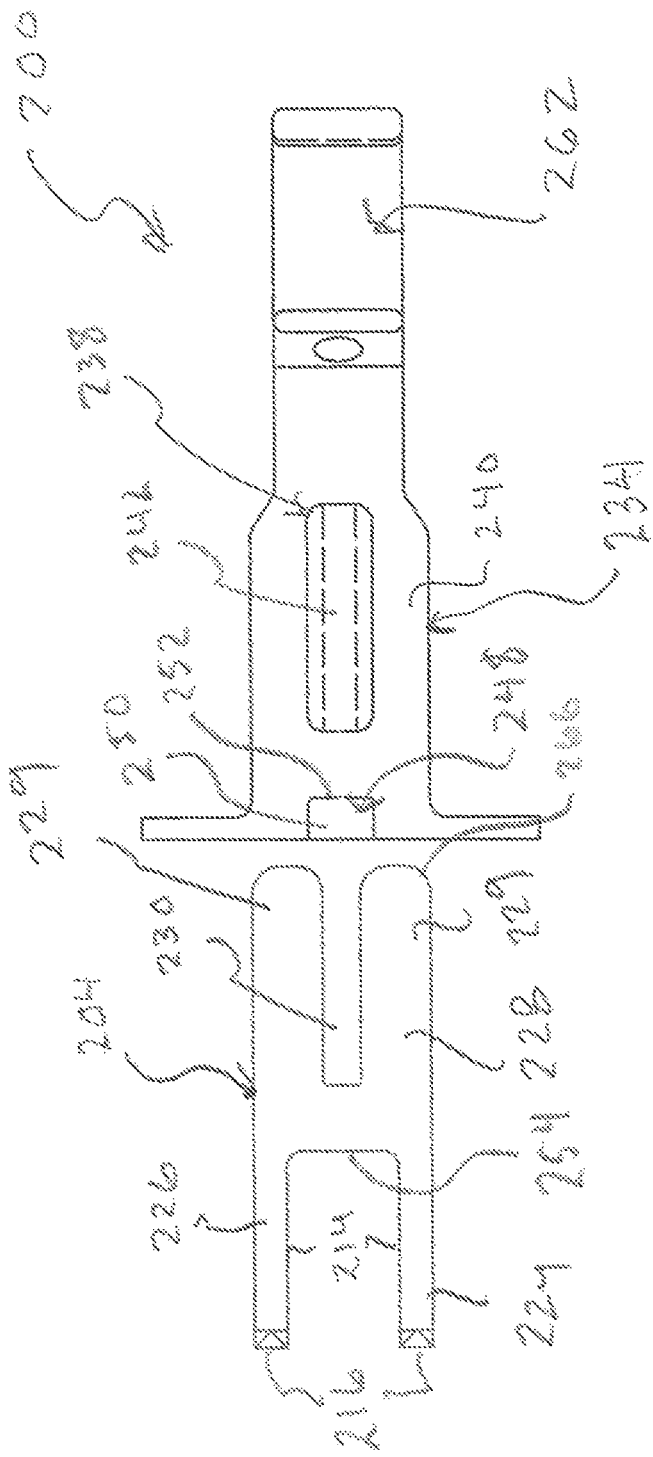
FIG. 2C is an exploded view of the two-piece rod bracket of FIG. 2A.
Figure 2D:
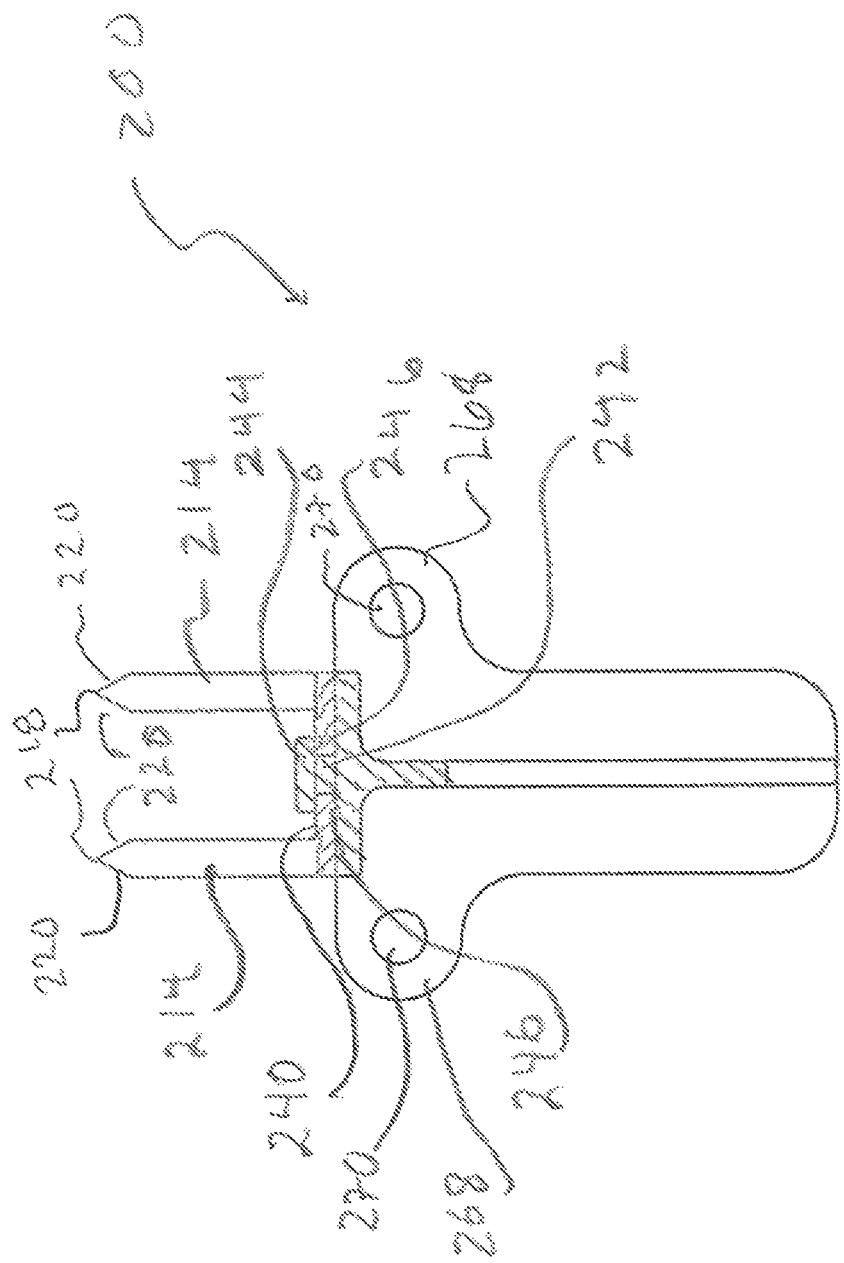
FIG. 2D is a front cross-section view of the two-piece rod bracket of FIG. 2A taken along line 2D-2D of FIG. 2A.
Figure 3A:
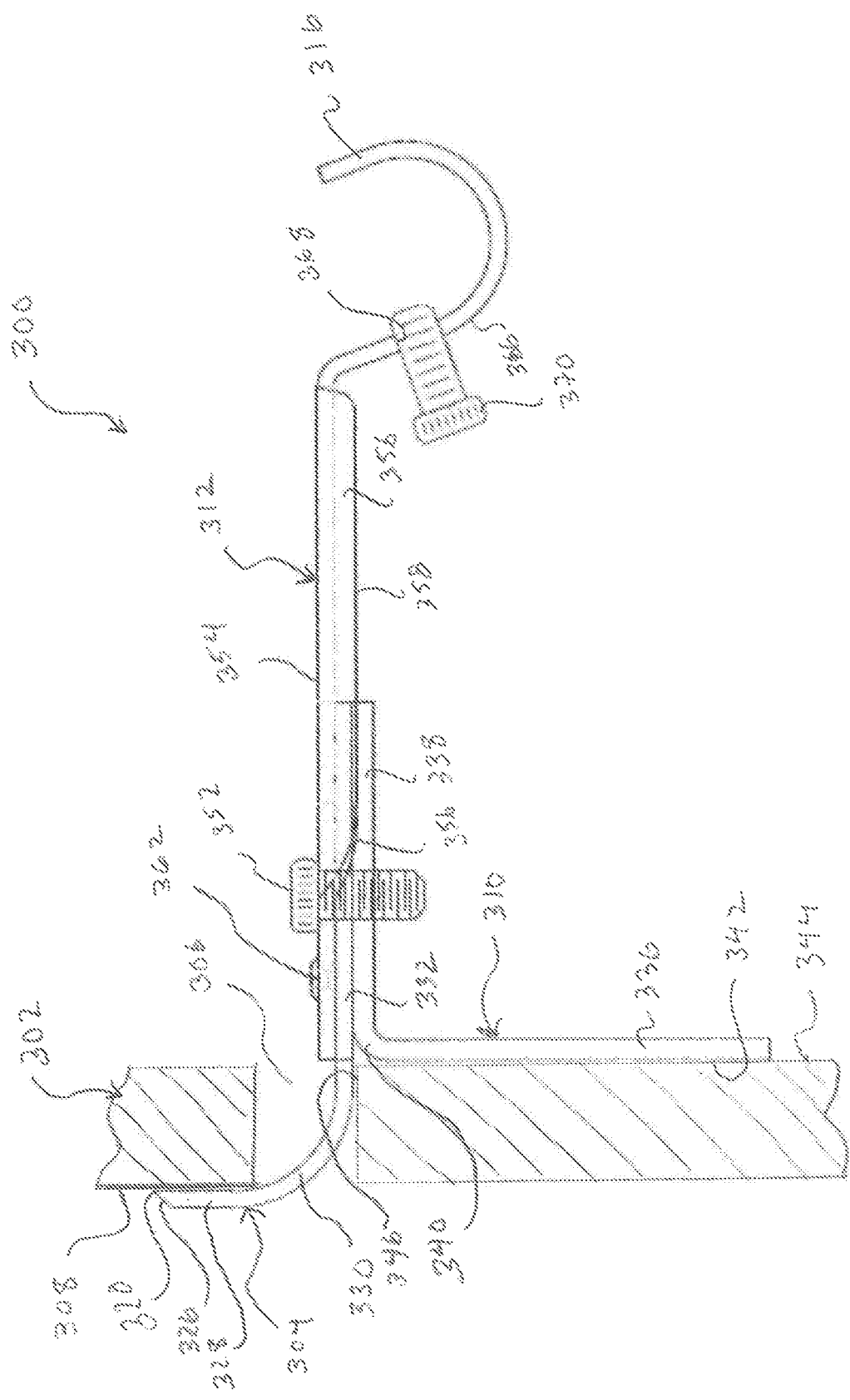
FIG. 3A is a side elevation view of a three-piece rod bracket.
Figure 3B:
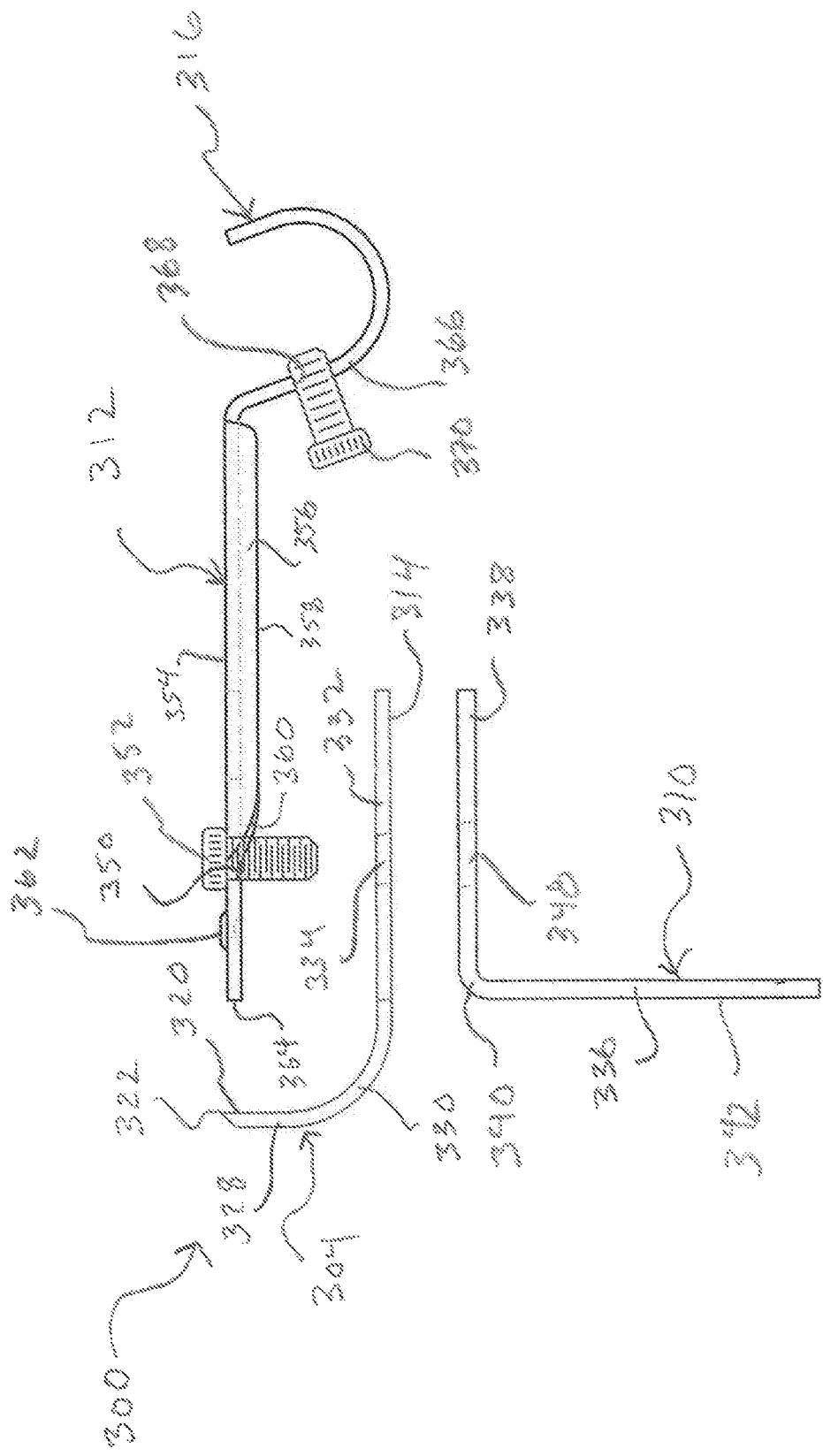
FIG. 3B is an exploded view of the three-piece rod bracket of FIG. 3A.
Figure 3C:
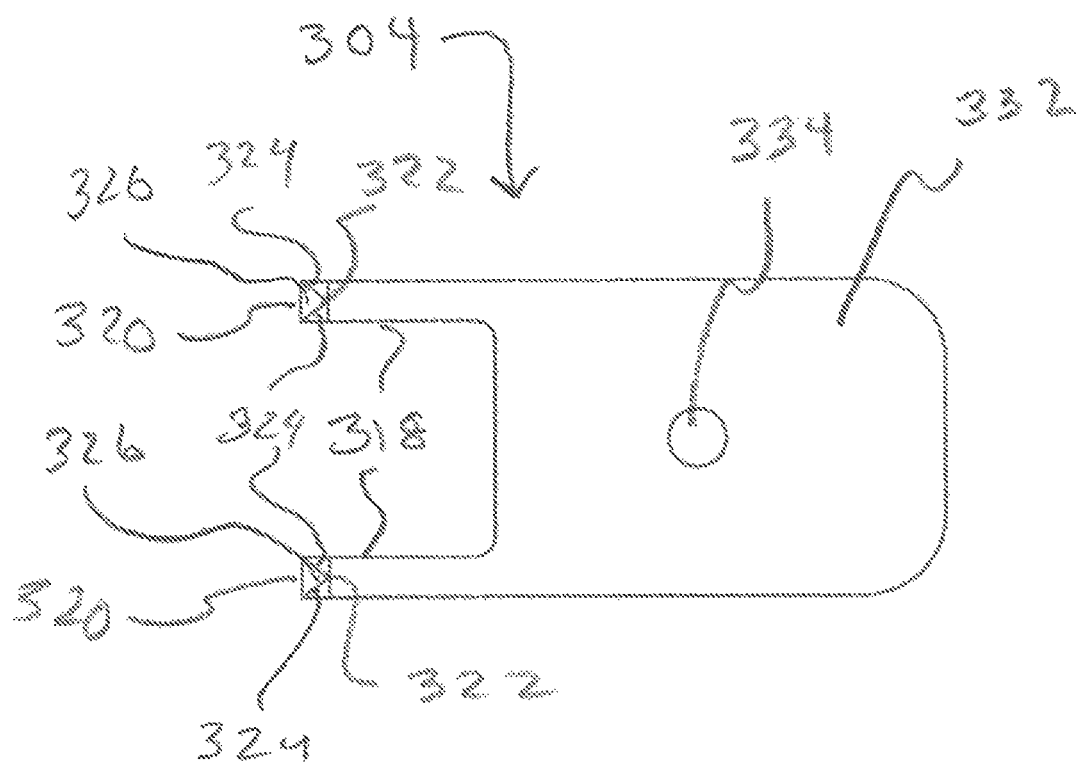
FIG. 3C is a top plan view of a prong mount of the three-piece rod bracket of FIG. 3A.
Figure 3D:
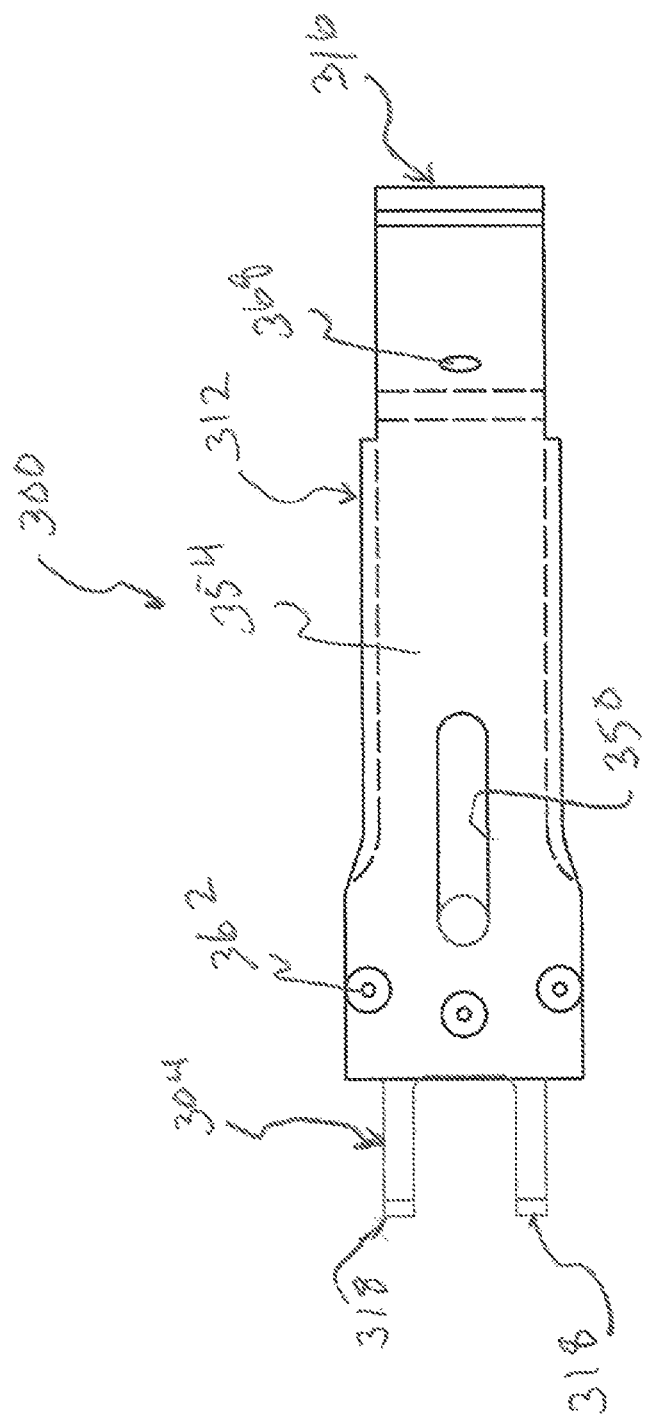
FIG. 3D is a top plan view of the three-piece rod bracket of FIG. 3A.

Referring to FIGS. 1A-1C, there is a single piece curtain rod bracket 100 that is installed on to a wall 102, such as drywall covered wall, without the use of any tools. The bracket 100 includes a prong portion 104 that is used to form a hole 106 through the wall 102, and then, the bracket 100 is inserted part way through the hole 106 to engage a backside 108 of the wall 102, while a leg portion 110 of the bracket 100 engages a frontside 112 of the wall 102.

The prong portion 104 includes a straight portion 114 and a curved portion 116. The curved portion 116 connects to a short straight portion 118. A first elbow portion 120 connects the straight portion 118 to the leg portion 110, and a second elbow 122 connects the leg portion 110 to a support arm portion 124. The support arm portion 124 may be curved such that it curves upward when the bracket 100 is installed on the wall 102. A third elbow portion 126 connects the arm portion 124 to a cradle 128. The cradle 128 can be any shape that holds the curtain rod. For example, it may be a closed loop or an open loop structure. One example is the open loop structure having a generally U-shaped cross-section that opens upward when the bracket 100 is installed on the wall 102. The cross-section may have other configurations other than the U-shaped cross-section. The cradle 128 includes a threaded screw 130 mounted in a complementary threaded hole 132 to secure a curtain rod in the cradle 128 from unintentional removal of the curtain rod from the cradle 128 and/or unintentional lateral movement in the cradle 128. The screw 130 engages a curtain rod and pins it against the front of the cradle 128.

The prong portion 104 is generally U-shaped with two prongs 134. Each prong 134 includes a pointed tip 136. Each pointed tip 136 includes an apex 138 and two lateral edges 140 on opposite sides of the apex 138 that angle downwardly from the apex 138. Each pointed tip 136 also includes a backside 142 that angles downwardly from the apex 138. The pointed tips 136 of the prongs 134 are used to puncture the wall 102 to form the hole 106. When the bracket 100 is installed, the pointed tips 136 may contact the backside 108 of the wall 102 and limit the bracket 100 from pivoting in the hole 106. The width of the prong portion 104 may also be greater than the height of the hole 106, which also limits the bracket 100 from pivoting in the hole 106.

By way of example only, the length of the prong portion 104 may be 0.70 inches, and the width of the prong portion 104 (as well as the entire bracket 100) may be 0.75 inches. Each prong 134 may have a width of 0.12 inches and a length of 0.11 inches. The radius of curvature of the curved portion 116 of the prong portion 104 may be 0.400 inches and the length of the straight portion 114 of the prong portion 104 may be 0.16 inches. The first and third elbow portions 120, 126 may be bent at about 90 degrees. The radius of curvature of the second elbow portion 122 may be 0.060 inches. The radius of curvature of the support arm portion 124 may be 1.769 inches. The radius of curvature of the cradle 128 may be 0.323 inches. The cradle 128 may angle backward toward the wall 102 at 20 degrees. The horizontal height of the center of the cradle 128 relative to the second elbow 122 portion may be 1.10 inches, and the horizontal height of a terminal edge 144 of the cradle 128 relative to the second elbow portion 122 may be 1.45 inches. The terminal edge 144 of the cradle 128 may be arcuate and may have a radius of curvature of 0.409 inches. The bracket 100 may be made from 0.08 inch thick steel.

When the bracket 100 installed on the wall 102, the straight portion 114 and the curved portion 116 of the prong portion 104 extend through the hole 106. The short straight portion 118 and the first elbow 120 may rest on the bottom of the hole 106 near and/or at the frontside 112 of the wall 102. The first elbow 120 may provide a pivot for the leg 110 to engage the frontside 112 of the wall 102 to provide support balanced against the prong section 104 engaging the backside 108 of the wall 102. The curved portion 116 of the prong portion 104 may engage the top of the hole 106 near/or at the backside 108 of the wall 102. The pointed tips 136 of the prongs 134 are able to scratch and/or slightly penetrate the backside 108 of the wall 102 and, along with the width of the bracket 100 relative to the size of the hole 106, limit the bracket 100 from swinging as a pendulum.

With reference to FIGS. 2A-2D, there is illustrated a two-piece curtain rod bracket 200 that is installed onto a wall 202, such as drywall covered wall, without the use of any tools. The bracket 200 includes a prong mount 204 that is used to form a hole 206 through the wall 202, and then, the prong mount 204 is inserted part way through the hole 206 to engage a backside 208 of the wall 202, while a rod support 210 engages a frontside 212 of the wall 202.

The prong mount 204 has a generally U-shaped portion with two prongs 214. Each prong 214 includes a pointed tip 216. Each pointed tip 216 includes an apex 218 and two lateral edges 220 on opposite sides of the apex 218 that angle downwardly from the apex 218. Each pointed tip 216 also includes a backside 222 that angles downwardly from the apex 218. The pointed tips 216 of the prongs 214 are used to puncture the wall 202 to form the hole 206. When the bracket 200 is installed, the pointed tips 216 may contact the backside 208 of the wall 202 and limit the bracket 200 from pivoting in the hole 206. The width of the prong mount 204 may also be greater than the height of the hole 206, which also limits the bracket 200 from pivoting in the hole 206. The prongs 214 may be used to penetrate the wall 202 to form the hole 206 without the use of tools.

Each prong 214 includes a straight section 224 and a curved section 226. The straight section 224 engages the backside 208 of the wall 202 when the bracket 200 is installed on the wall 202. The curved section 226 may engage the top of the hole 206 near/at the backside of 208 of the wall 202. The curved section 226 extends from a base plate 228. The base plate 228 includes two legs 229 that define an elongated slot 230 used to connect the prong mount 204 with the rod support 210.

The rod support 210 includes a wall leg 232 and a support leg 234 that may be perpendicular to one another. The legs 232, 234 are straight. The wall leg 232 includes a smooth surface 236 for engaging the frontside 212 of the wall 202. The support leg 234 includes a rail 238 on a topside 240 that engages the elongated slot 230 for mounting the prong mount 204. More specifically, the rail 238 includes a first elongated wall 242 projecting from the topside 240 and a second elongated wall 244 extending across the first elongated wall 242 to from a T-shape cross-section for the rail 238. The walls 242, 244 form a channel 246 on each side of the rail 238 with the topside 240 of the support leg 234. The channels 246 receive an inner portion of the legs 229 of the base plate 228 with the first elongated wall 242 in the elongated slot 230. The engagement between the base plate 228 and the rail 238 can be a friction fit. For example, the width of the elongated slot 230 may only be slightly larger than that thickness of the first elongated wall 242, and the height of the channels 246 may only be slightly greater than the thickness of the base plate 228.

A cam lock 248 projects from the topside 240 of the support leg 234. The cam lock 248 includes a ramp surface 250 and a lock surface 252 extending perpendicular to the topside 240 of the support leg 234. When attaching the prong mount 204 to the rod support 210, the base plate 228 slides over the ramp surface 250 while the elongated slot 230 is being slid along the rail 238. When the elongated slot 230 is fully inserted on to the rail 238, the lock surface 252 of the cam lock 248 engages a bottom edge 254 of the prong mount 204 between the prongs 214.

A web 256 extends between the wall leg 232 and the support let 234 to provide support to increase the support load of the bracket 200. The web 256 may define a window 258 and include an arcuate edge 260.

The wall leg 232 of the rod support 210 may include laterally spaced tabs 268 which each define a hole 270. The holes 268 can be used with the prong mount 204 or without the prong mount 204 as an alternative mounting method for the rod support 210. The holes 270 can receive fasteners, such as screws or nails, to mount the rod support 210 to a wall.

A cradle 262 is at the end of the support leg 234. The cradle 262 opens upward but could also be angled backward or forward. The cradle 262 defines a threaded hole 264 for a screw to be threaded through to engage a rod in the cradle 262 to secure the rod from unintentional removal from the cradle 262.

By way of example only, the prong mount 204 could have a length of 1.766 inches and a width of 0.652 inches. The elongated slot 230 could have a width of 0.140 inches. The legs 229 defining the elongated slot 230 could have rounded corners 266 to help mounting of the prong mount 204 on the rail 238. The rounded corners 266 may have a radius of curvature of 0.100 inches. The legs 229 could have a length of 0.803 inches, and the distance from the bottom edge 254 to the end of the legs 229 could be 1.043 inches. The width of the prongs 214 could be 0.120 inches, the internal spacing between the prongs 214 may be 0.412 inches, and the length of the pointed tips 216 could be 0.063 inches. The radius of curvature of the curved section 226 could be 0.400 inches. The height of the prong mount 204 could be 0.700 inches measured from the base plate 228 to an imaginary line parallel to the base plate 228 and intersecting a pointed tip 216. The prong mount 204 may be made of steel having a thickness of 0.063 inches. The rod support 210 may be made from acrylonitrile butadiene styrene.

Regarding FIGS. 3A-3D, there is illustrated a three-piece curtain rod bracket 300 that is installed on to a wall 302, such as drywall covered wall, without the use of any tools. The bracket 300 includes a prong mount 304 that is used to form a hole 306 through the wall 302, and then, the prong mount 304 is inserted part way through the hole 306 to engage a backside 308 of the wall 302. The bracket 300 includes an angle bracket 310 and a rod support arm 312. The prong mount 304 attaches to the angle bracket 310 and the support arm 312. The angle bracket 310 engages a frontside 344 of the wall 302 and a bottom side 314 of the prong mount 304 to support the support arm 312. The support arm 312 includes a cradle 316 to hold a curtain rod.

The prong mount 304 has a generally U-shaped portion with two prongs 318. Each prong 318 includes a pointed tip 320. Each pointed tip 320 includes an apex 322 and two lateral edges 324 on opposite sides of the apex 322 that angle downwardly from the apex 322. Each pointed tip 320 also includes a backside 326 that angles downwardly from the apex 322. The pointed tips 320 of the prongs 318 are used to puncture the wall 302 to form the hole 306. When the bracket 300 is installed, the pointed tips 320 may contact the backside 308 of the wall 302 and limit the bracket 300 from pivoting in the hole 306. The width of the prong mount 304 may also be greater than the height of the hole 306, which also limits the bracket 300 from pivoting in the hole 306. The prongs 318 may be used to penetrate the wall 302 to form the hole 306 without the use of tools.

Each prong 318 includes a straight section 328 and a curved section 330. The straight section 328 engages the backside 308 of the wall 302 when the bracket 300 is installed on the wall 302. The curved section 330 may engage the top of the hole 306 near/at the backside 308 of the wall 302. The curved section 330 extends from a base plate 332. The base plate 332 defines a hole 334 used to connect the prong mount 304 to the angle bracket 310 and the rod support arm 312.

The angle bracket 310 includes a first leg 336 and a second leg 338. The legs 336, 338 meet at elbow 340 at about a 90 degree angle. The first leg 336 includes a back surface 342 that engages a frontside 344 of the wall 302 to support the bracket 300 from pivoting in the hole 306 and damaging the wall 302 at the hole 306. The elbow 340 and the prong mount 304 meet at a front, bottom portion 346 of the hole 306. The second leg 338 extends under the rod support arm 312 and the base plate 332 of the prong mount 304 to support the rod support arm 312. The base plate 332 of the prong mount 304 is sandwiched between the rod support arm 312 and the second leg 338. The second leg 338 includes a threaded hole 348 that aligns with hole 334 in the base plate 332 and a hole or slot 350 in the rod support arm 312. A screw 352 extends through the holes 334, 348, 350 to secure the prong mount 304, the angle bracket 310 and the rod support arm 312 together. The slot 350 allows the rod support arm 312 to be adjusted relative to the angle bracket 310.

The rod support arm 312 includes a top plate 354 and side plates 356 depending downwardly from the top plate 354 on each side of the top plate 354. The side plates 356 enhance the strength of the rod support arm 312 so that it resists downward bending under increased loads held by the cradle 316. A portion of the base plate 332 fits into a channel 358 formed between the top plate 354 and the side plates 356. The side plates 356 prevent lateral movement of the base plate 332 of the prong mount 304. The side plates 356 include arcuate rearward edges 360.

The rod support arm 312 also may include holes 362 along a back edge 364 so that the rod support arm 312 can be mounted without the prong mount 304 and the angle bracket 310. The holes 362 may be used with fasteners, such as screws and/or nails, to attach the rod support arm 312 directly to trim of a window frame.

The cradle 316 includes a U-shaped configuration. A back segment 366 includes a threaded hole 368 that cooperates with a screw 370 that engages a curtain rod to hold the curtain rod in the cradle 316. The U-shaped configuration may be angled backward toward the wall 302.

The components of the bracket 300 may be made from 0.063 inches thick steel.

Figure 4A:
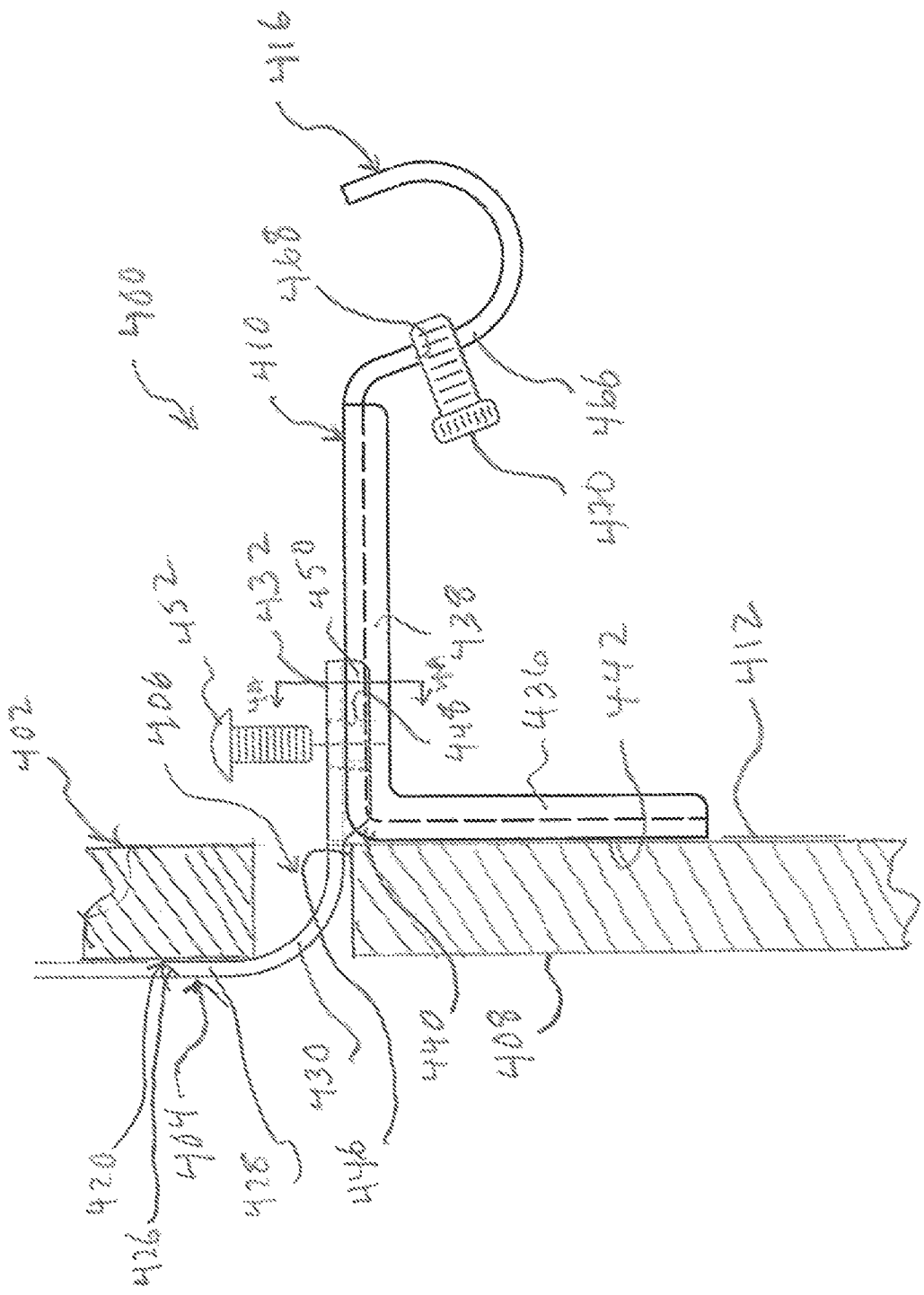
FIG. 4A is a side elevation view of another two-piece rod bracket.
Figure 4B:
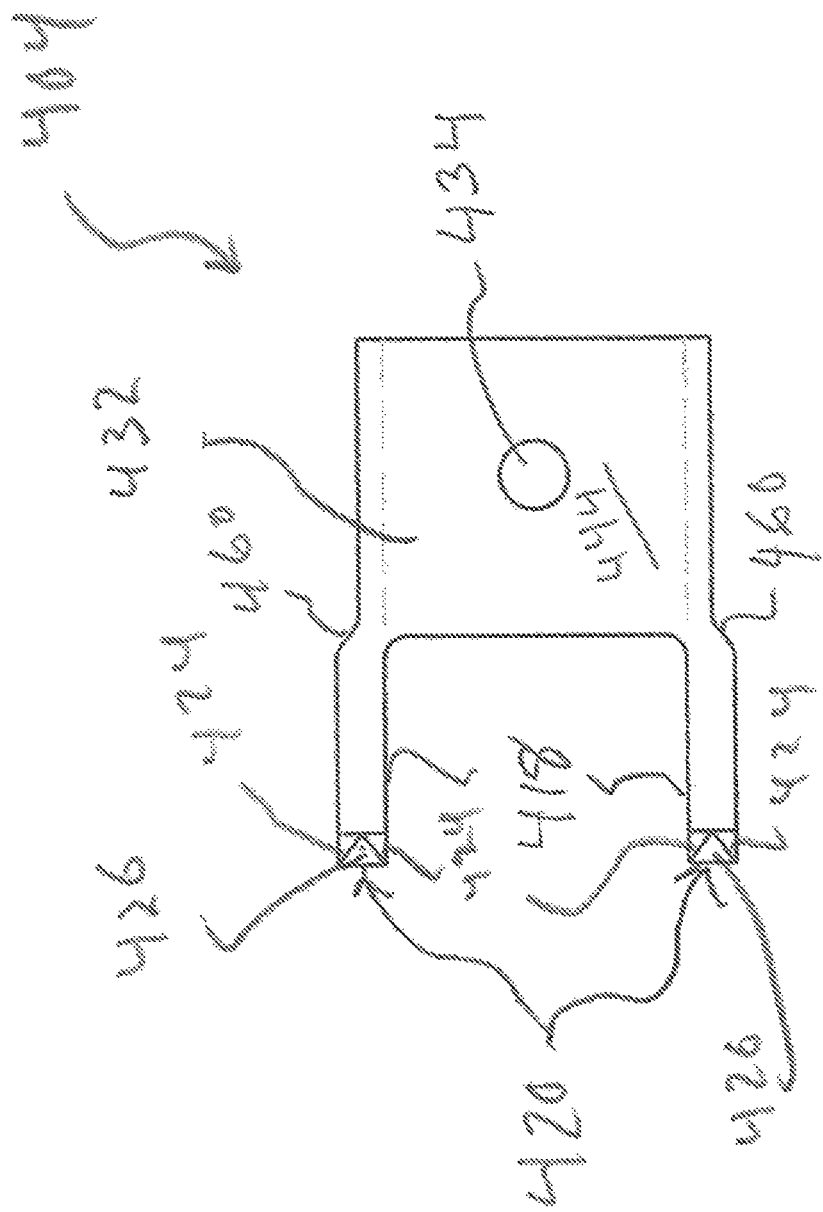
FIG. 4B is a top plan view of a prong mount of the two-piece rod bracket of FIG. 4A.
Figure 4C:
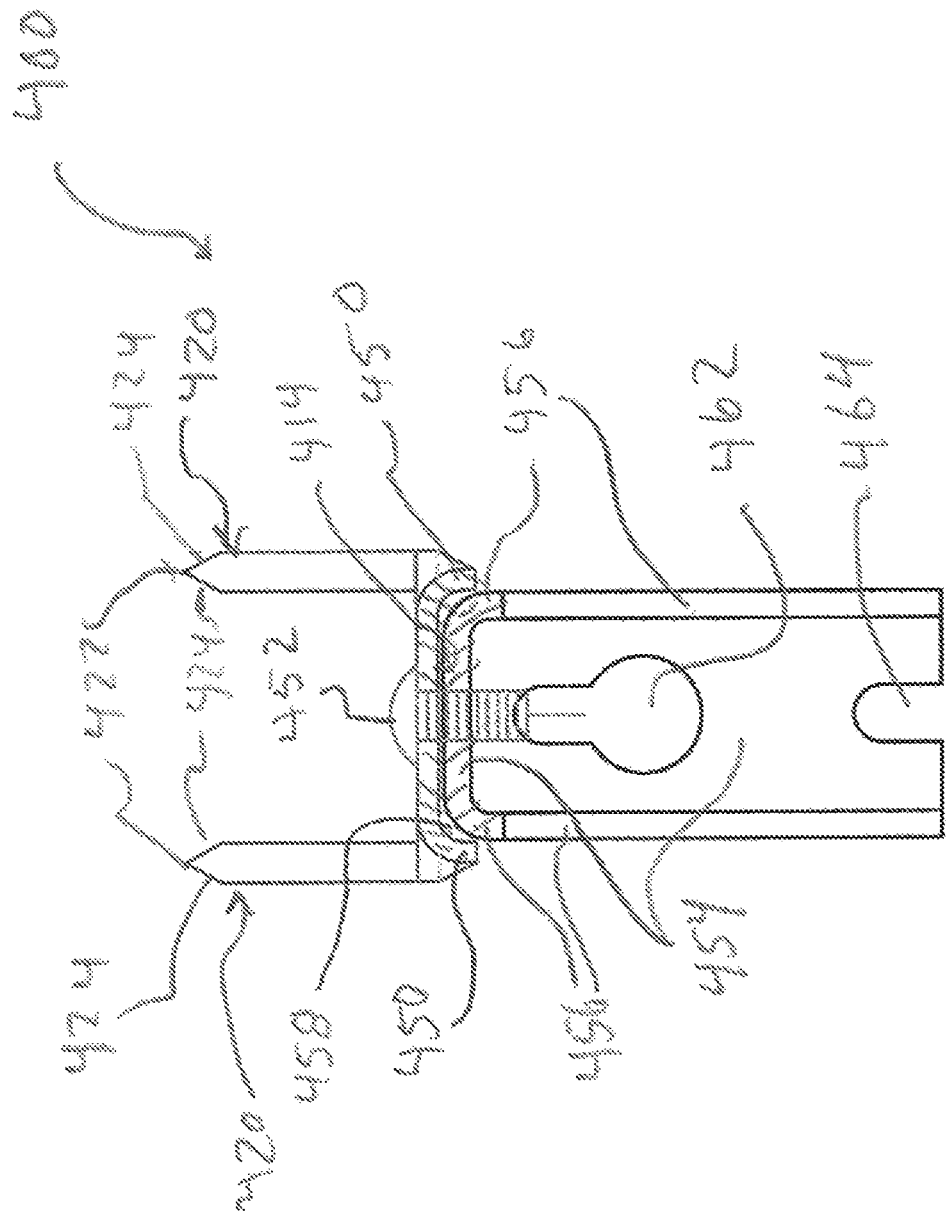
FIG. 4C is a cross-section view of the two-piece rod bracket of FIG. 4A taken along line 4A-4A of FIG. 4A.

Regarding FIGS. 4A-4C, there is illustrated a two-piece curtain rod bracket 400 that is installed on to a wall 402, such as drywall covered wall, without the use of any tools. The bracket 400 includes a prong mount 404 that is used to form a hole 406 through the wall 402, and then, the prong mount 404 is inserted part way through the hole 406 to engage a backside 408 of the wall 402. The bracket 400 includes a rod support arm 410. The prong mount 404 attaches to the rod support arm 410. The rod support arm 410 engages a frontside 412 of the wall 402 and a bottom side 414 of the prong mount 404 to support the rod support arm 410. The rod support arm 410 includes a cradle 416 to hold a curtain rod.

The prong mount 404 has a generally U-shaped portion with two prongs 418. Each prong 418 includes a pointed tip 420. Each pointed tip 420 includes an apex 422 and two lateral edges 424 on opposite sides of the apex 422 that angle downwardly from the apex 422. Each pointed tip 420 also includes a backside 426 that angles downwardly from the apex 422. The pointed tips 420 of the prongs 418 are used to puncture the wall 402 to form the hole 406 without the use of tools. When the bracket 400 is installed, the pointed tips 420 may contact the backside 408 of the wall 402 and limit the bracket 400 from pivoting in the hole 406. The width of the prong mount 404 may also be greater than the height of the hole 406, which also limits the bracket 400 from pivoting in the hole 406.

Each prong 418 includes a straight section 428 and a curved section 430. The straight section 428 engages the backside 408 of the wall 402 when the bracket 400 is installed on the wall 402. The curved section 430 may engage the top of the hole 406 near/at the backside 408 of the wall 402. The curved section 430 extends from a base plate 432. The base plate 432 defines a hole 434 used to connect the prong mount 404 to the angle bracket the rod support arm 410.

The rod support arm 410 includes a first leg 436 and a second leg 438. The legs 436, 438 meet at elbow 440 at about a 90 degree angle. The first leg 436 includes a back surface 442 that engages a frontside 412 of the wall 402 to support the bracket 400 against pivoting in the hole 406 and damaging the wall 402 at the hole 406. The elbow 440 and the prong mount 404 meet at a front, bottom portion 446 of the hole 406. The second leg 438 extends under the base plate 432 of the prong mount 404 to support the rod support arm 410. The second leg 438 includes a threaded hole 448 that aligns with the hole 434 in the base plate 432. A screw 452 extends through the holes 434, 448 to secure the prong mount 404 and the rod support arm 410 together.

The legs 436, 438 of the rod support arm 410 include a top portion 454 and side portion 456 projecting perpendicularly from the top portion 454. The side portions 456 enhance the strength of the rod support arm 410 so that it resists downward bending under increased loads held by the cradle 416. The base plate 432 incudes a center portion 444 and side portions 450 projecting perpendicularly away from center portion 444. A portion of the second leg 438 fits into a channel 458 formed between the center portion 444 and side portions 450. The side portions 450 prevent lateral movement of the base plate 432 of the prong mount 404 relative to the rod support arm 410. The side portions 450 include angled rearward edges 460.

The first leg 436 of the rod support arm 410 also may include holes or slots 462, 464 so that the rod support arm 410 can be mounted without the prong mount 404. The holes 462, 464 may be used with fasteners, such as screws and/or nails, to attach the rod support arm 410 directly to a wall. This may be the case for any embodiment having a first leg of a rod support arm with vertically aligned holes.

The cradle 416 includes a U-shaped configuration. A back segment 466 includes a threaded hole 468 that cooperates with a screw 470 that engages a curtain rod to hold the curtain rod in the cradle 416. The U-shaped configuration may be angled backward toward the wall 402. The U-shaped configuration of the cradle 416 may also be angled upward or forward.

By way of example only, the maximum width the of the prong mount 404 may be 1.004 inches, and the maximum width of the rod support arm 410 may be 0.750 inches. The length of the rod support arm 410 to the center of the cradle 416 may be 2.430 inches. The components of the bracket 400 may be made from 0.063 inches thick steel.

Figure 5A:
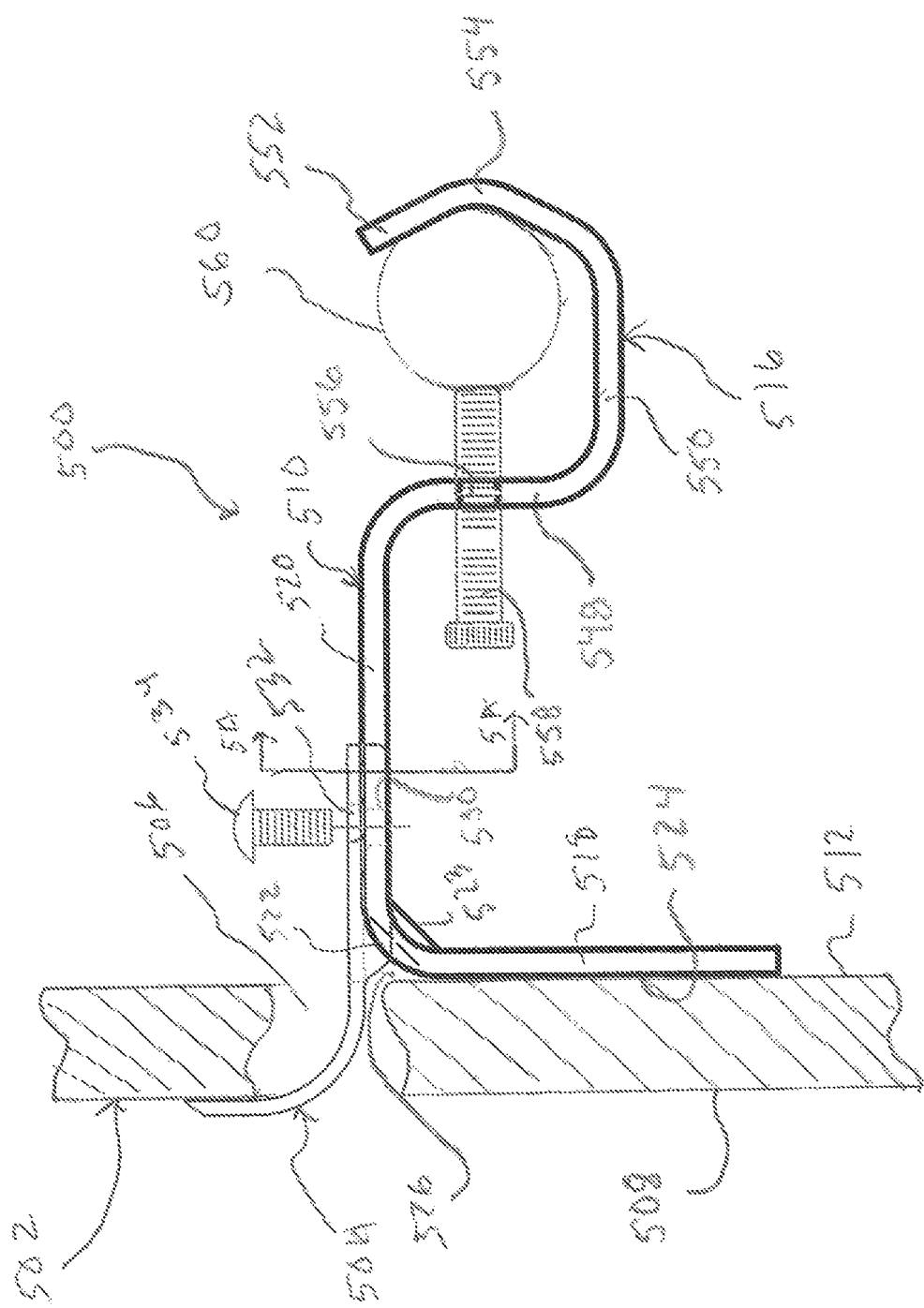
FIG. 5A is a side elevation view of another two-piece rod bracket.
Figure 5B:
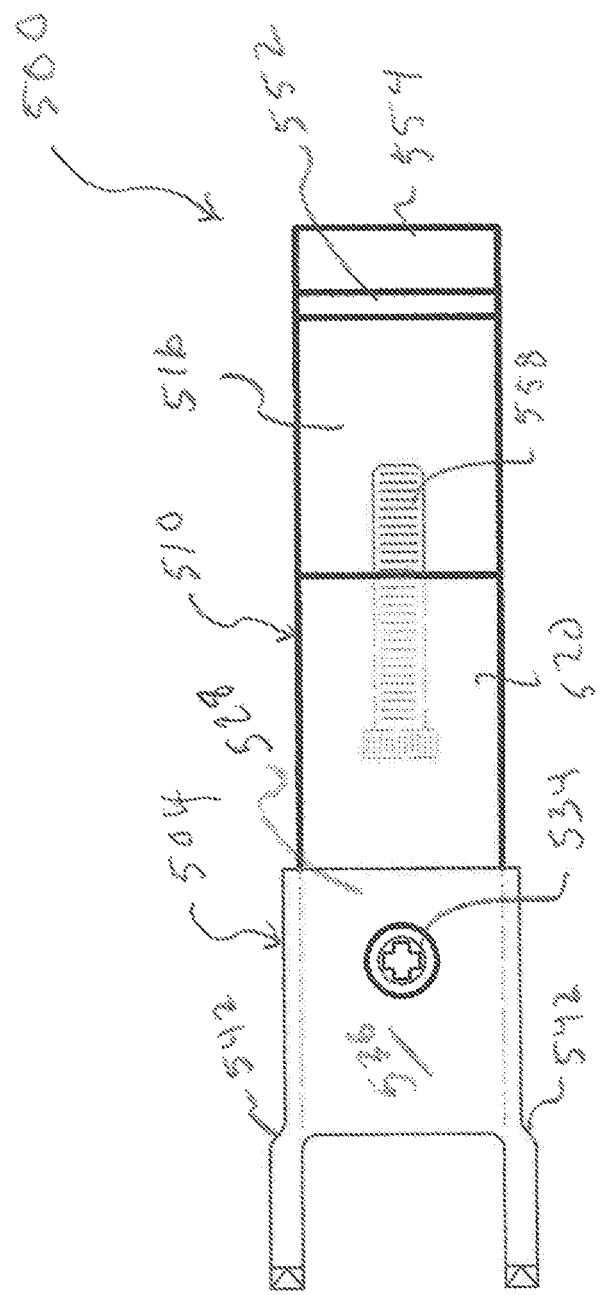
FIG. 5B is a top plan view of the two-piece rod bracket of FIG. 5A.
Figure 5C:
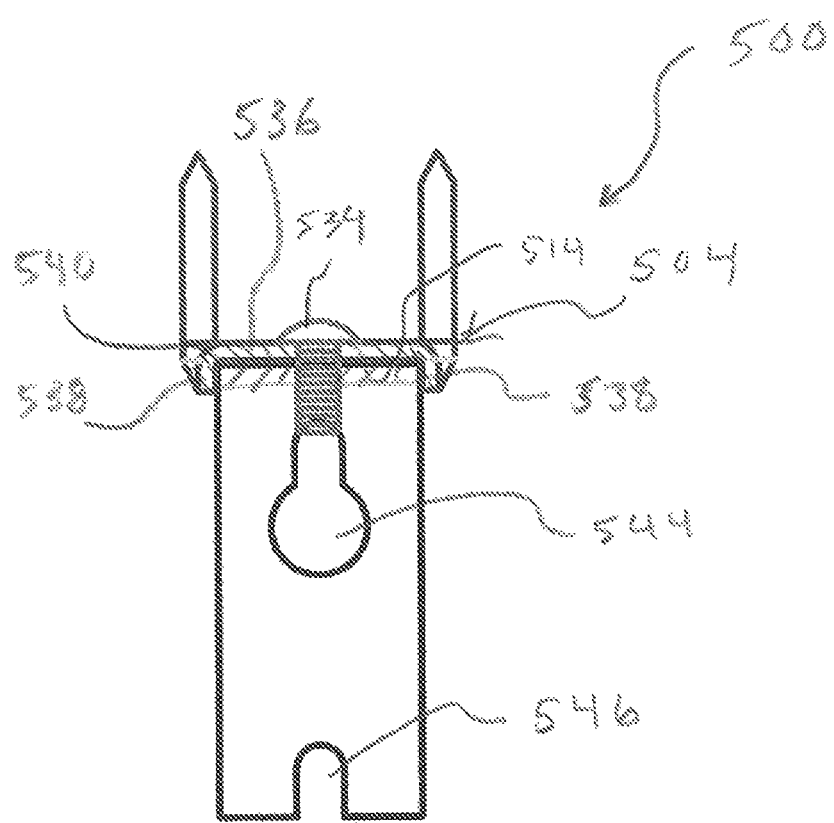
FIG. 5C is a cross-section view of the two-piece rod bracket of FIG. 5A taken along line 5A-5A of FIG. 5A.

Regarding FIGS. 5A-5C, there is illustrated a two-piece curtain rod bracket 500 that is installed on to a wall 502, such as drywall covered wall, without the use of any tools. The bracket 500 includes a prong mount 504 that is used to form a hole 506 through the wall 502, and then, the prong mount 504 is inserted part way through the hole 506 to engage a backside 508 of the wall 502. The bracket 500 includes a rod support arm 510. The prong mount 504 attaches to the rod support arm 510. The rod support arm 510 engages a frontside 512 of the wall 502 and a bottom side 514 of the prong mount 504 to support the rod support arm 510. The rod support arm 510 includes a cradle 516 to hold a curtain rod.

The prong mount 504 is identical to the prong mount 404 discussed above and will not be described again in connection with the bracket 500. The rod support arm 510 includes a first leg 518 and a second leg 520. The legs 518, 520 meet at elbow 522 at about a 90-degree angle. A web 523 extends between the legs 518, 520 at the elbow 522 to provide strength to resist the legs 518, 520 from collapsing towards one another. The first leg 518 includes a back surface 524 that engages a frontside 512 of the wall 502 to support the bracket 500 against pivoting in the hole 506 and damaging the wall 502 at the hole 506. The elbow 522 and the prong mount 504 meet at a front, bottom portion 526 of the hole 506. The second leg 520 extends under a base plate 528 of the prong mount 504 to support the rod support arm 510. The second leg 520 includes a threaded hole 530 that aligns with a hole 532 in the base plate 528. A screw 534 extends through the holes 530, 532 to secure the prong mount 504 and the rod support arm 510 together.

The base plate 528 incudes a center portion 536 and side portions 538 projecting perpendicularly away from center portion 536. A portion of the second leg 520 fits into a channel 540 formed between the center portion 536 and side portions 538. The side portions 538 prevent lateral movement of the base plate 528 of the prong mount 504 relative to the rod support arm 510. The side portions 538 include angled rearward edges 542.

The first leg 518 of the rod support arm 510 also may include holes or slots 544, 546 so that the rod support arm 510 can be mounted without the prong mount 504. The holes 544, 546 may be used with fasteners, such as screws and nails, to attach the rod support arm 510 directly to a wall.

The cradle 516 may include a straight back 548, a straight bottom 550 and a hooked front 552 with a V-shaped notch 554. The straight back 548 may include a threaded hole 556 that receives a screw 558. The screw 558 engages a rod and pushes the rod into a locking arrangement at the hooked front 552 so that the rod cannot unintentionally be removed from the cradle 516. More specifically, the V-shaped notch 554 enables the hooked front 552 to accommodate a wide range of rod sizes including, for example, $3/8$" to 1" outer diameter. For rods at the lower end of this range, the screw 558 might pass above the rod if the rod rests on the straight bottom 550 of the cradle 516, which is not desired. It is therefore desired that the screw 558 be centered on the rod 560 to push the rod 560 into the V-shaped notch 554 regardless of the diameter of the rod 560. With the notch 554, the rod 560 can be placed in the notch 554, and the screw 558 can engage the rod 560 to hold the rod 560 in the notch 554. As shown in FIG. 5A, the rod 560 could be suspended above the straight bottom 550 of the cradle 516. In some cases, a rod may be large enough in diameter to rest on the straight bottom 550 of the cradle 516 with the screw 558 holding the rod in the notch 554. Overall, the V-shaped notch 554 increases the range of rod diameters that can be used with the cradle 516.

The bracket 500 may be made from 0.63 inches thick steel.

Figure 6A:
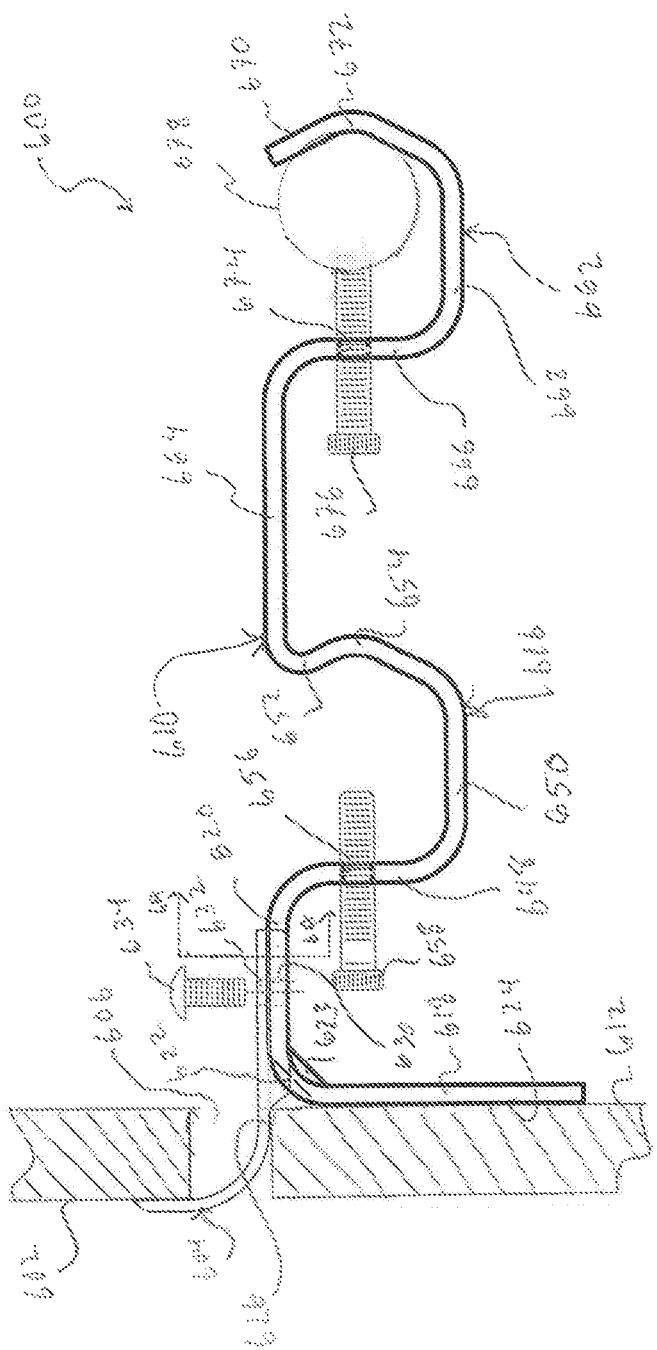
FIG. 6A is a side elevation view of another two-piece rod bracket.
Figure 6B:
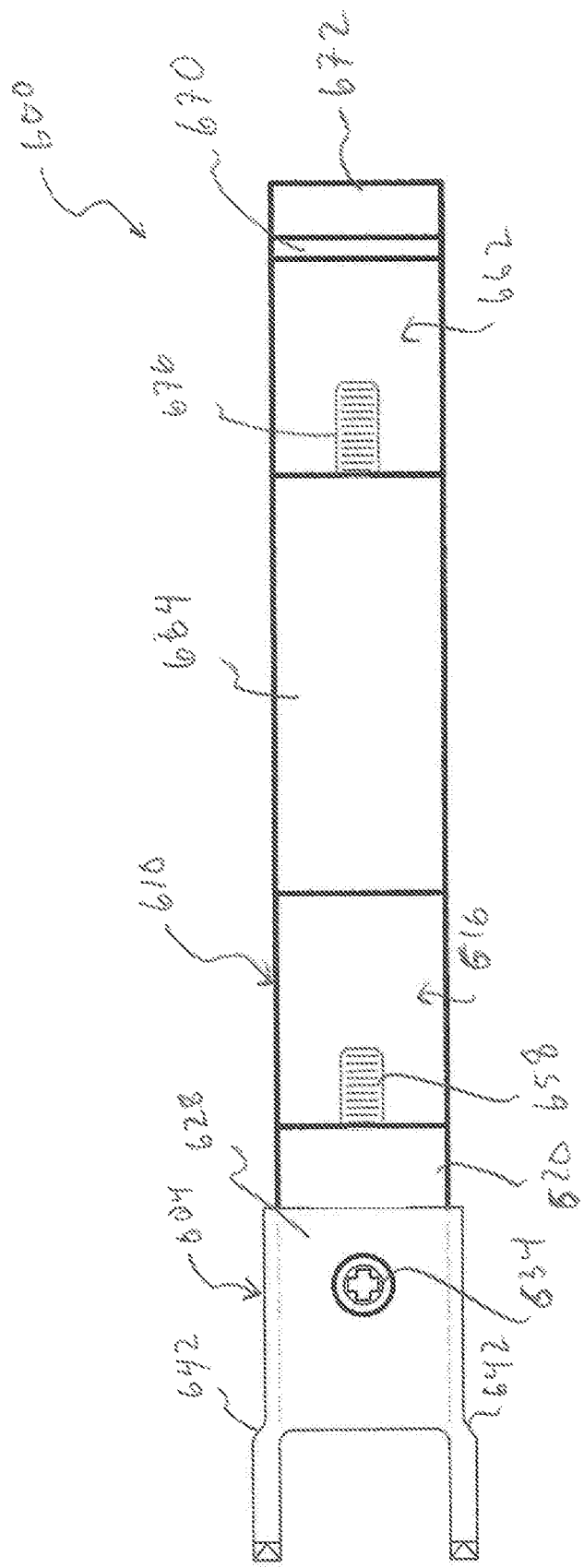
FIG. 6B is a top plan view of the two-piece rod bracket of FIG. 6A.
Figure 6C:
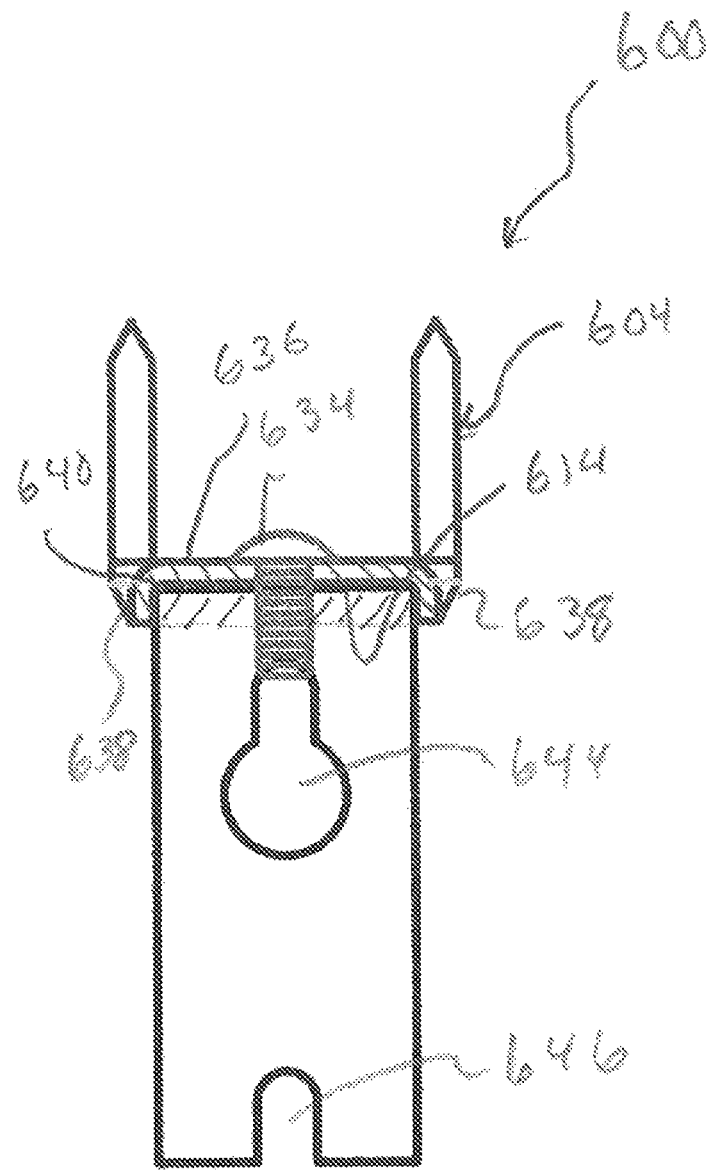
FIG. 6C is a cross-section view of the two-piece rod bracket of FIG. 6A take along linen 6A-6A of FIG. 6A.
Figure 7A:
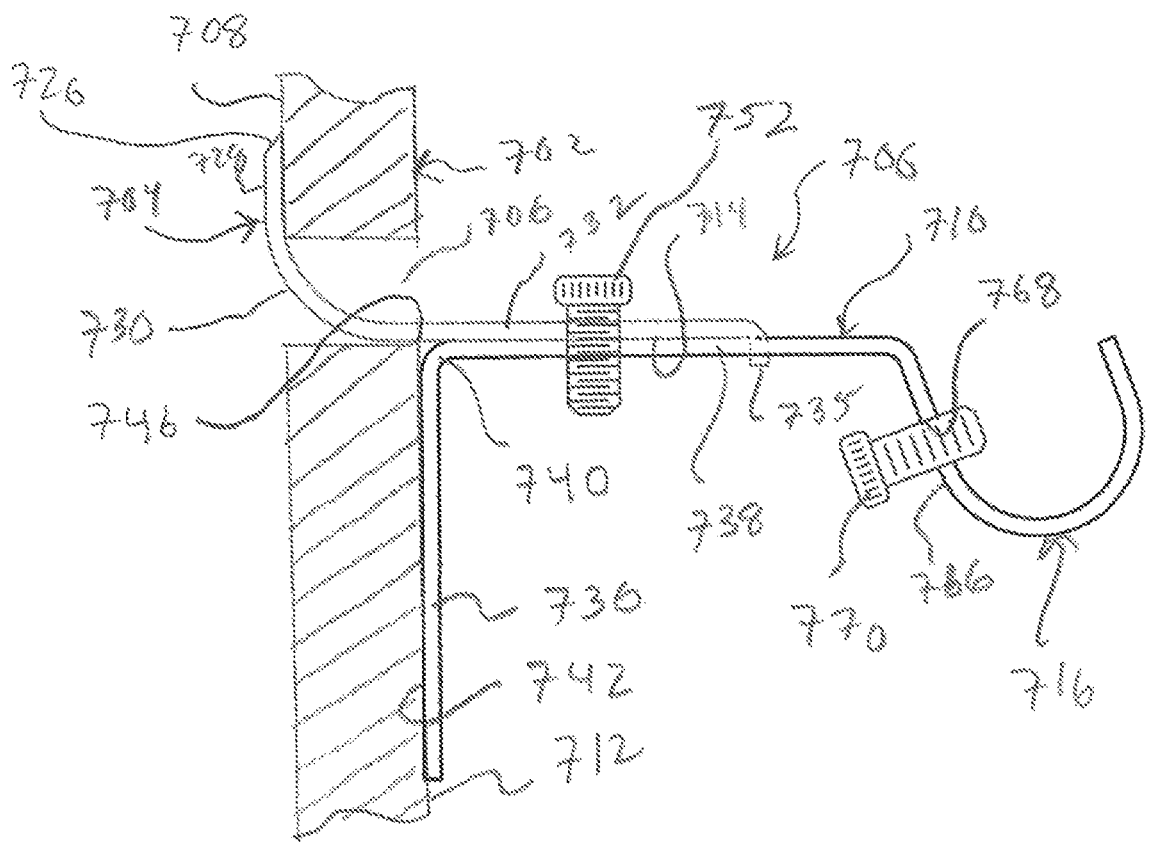
FIG. 7A is a side elevation view of another two-piece rod bracket.
Figure 7B:
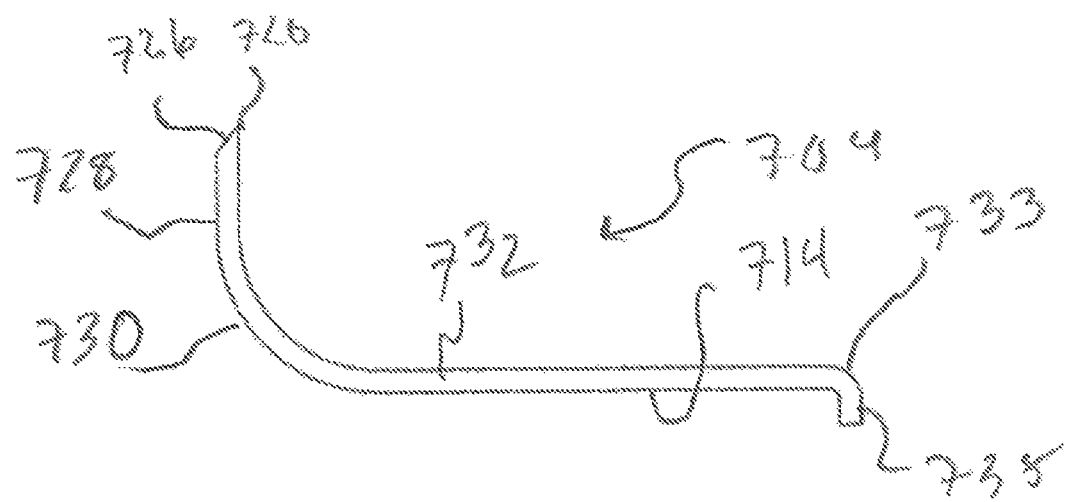
FIG. 7B is a side elevation view of a prong mount of the two-piece rod bracket of FIG. 7A.
Figure 7C:
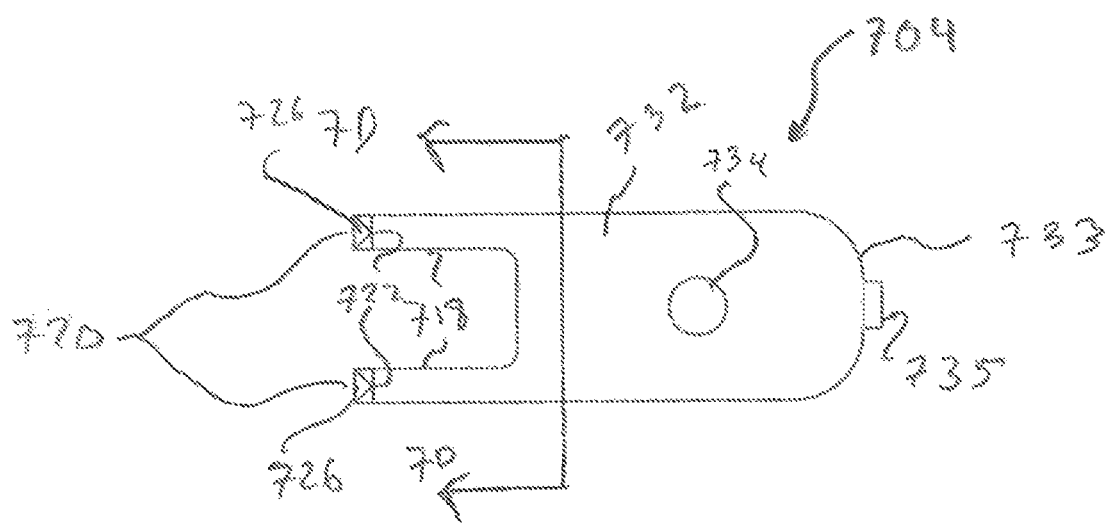
FIG. 7C is a top plain view of the prong mount of the two-piece rod bracket of FIG. 7A.
Figure 7D:
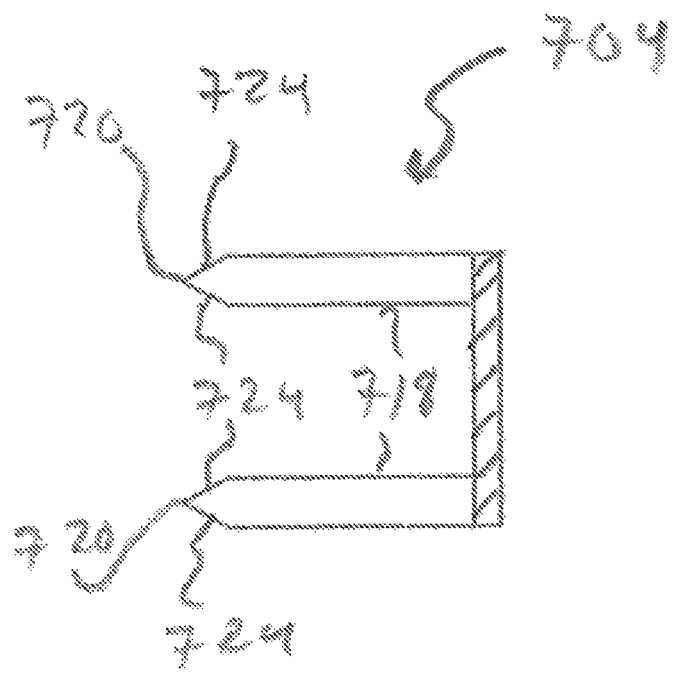
FIG. 7D is a front cross-section view of the prong mount of the two-piece rod bracket of FIG. 7A taken along line 7D-7D of FIG. 7C.
Figure 7E:
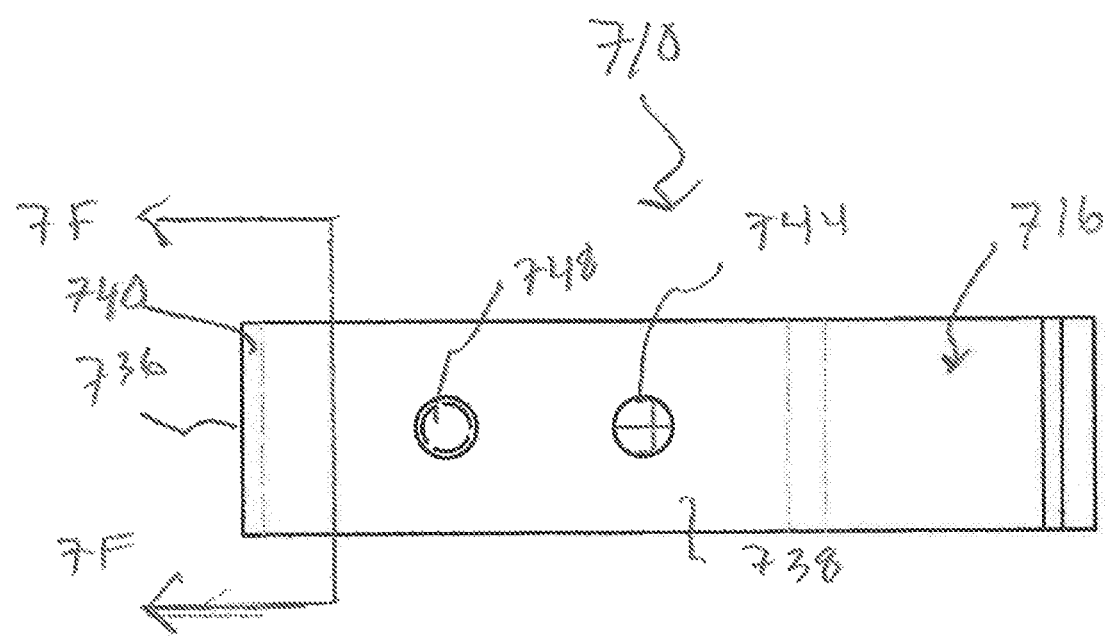
FIG. 7E is a top plan view of a rod support arm of the two-piece rod bracket of FIG. 7A.
Figure 7F:
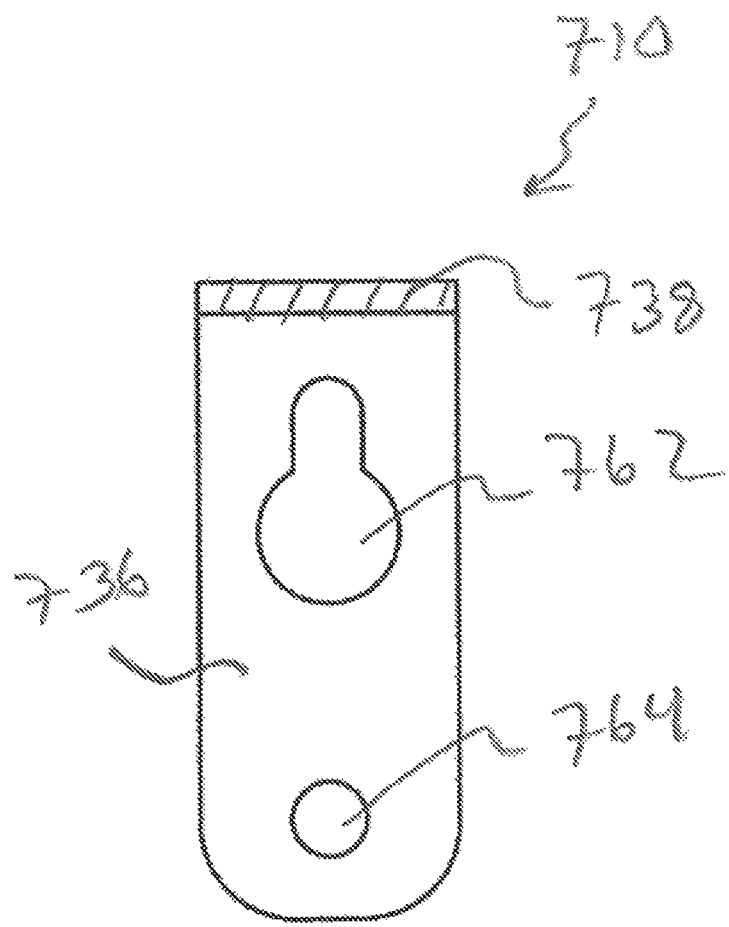
FIG. 7F is a cross-section view of the rod support arm of the two-piece rod bracket of FIG. 7A taken along line 7F-7F of FIG. 7E.

Regarding FIGS. 6A-6C, there is illustrated a two-piece curtain rod bracket 600 that is installed on to a wall 602, such as drywall covered wall, without the use of any tools. The bracket 600 is identical to bracket 500 except that it includes a second cradle 662 that enables the rod bracket 600 to support two rods. The elements of the bracket common with the bracket 500 will not be described again but will be referred to on FIGS. 6A-6C with the same numbers as for the bracket 500 except that the numbers will be in the 600 series.

The rod support arm 610 includes a straight portion 664 extending to the second cradle 662. Like the first cradle 616, the second cradle may include a straight back 666, a straight bottom 668 and a hooked front 670 with a V-shaped notch 672. The straight back 668 may include a threaded hole 674 that receives a screw 676. The screw 676 engages a rod and pushes the rod into a locking arrangement at the hooked front 670 so that the rod cannot unintentionally release upward from the second cradle 662. More specifically, the V-shaped notch 672 enables the hooked front 670 to accommodate a wide range of rod sizes including, for example, ⅜" to 1" outer diameter. For rods at the lower end of this range, the screw 676 might pass above the rod if the rod rests on the straight bottom 668 of the second cradle 662, which is not desired. It is therefore desired that the screw 676 be centered on the rod 678 to push the rod 678 into the V-shaped notch 672 regardless of the diameter of the rod 678. With the notch 672, the rod 678 can be placed in the notch 672, and the screw 676 can engage the rod 678 to hold the rod 678 in the notch 672. In this case, the rod 678 could be suspended above the straight bottom 668 of the second cradle 662. In some cases, a rod may be large enough in diameter to rest on the straight bottom 668 of the second cradle 662 with the screw 676 holding the rod in the notch 672. Overall, the V-shaped notch 672 increases the range of rod diameters that can be used with the second cradle 662.

The bracket 600 may be made from 0.63 inches thick steel.

Regarding FIGS. 7A-7F, there is illustrated a two-piece curtain rod bracket 700 that is installed to a wall 702, such as drywall covered wall, without the use of any tools. The bracket 700 includes a prong mount 704 that is used to form a hole 706 through the wall 702, and then, the prong mount 704 is inserted part way through the hole 706 to engage a backside 708 of the wall 702. The bracket 700 includes a rod support arm 710. The prong mount 704 attaches to the rod support arm 710. The rod support arm 710 engages a frontside 712 of the wall 702 and a bottom side 714 of the prong mount 704 to support the support arm 710. The support arm 712 includes a cradle 716 to hold a curtain rod.

The prong mount 704 has a generally U-shaped portion with two prongs 718. Each prong 718 includes a pointed tip 720. Each pointed tip 720 includes an apex 722 and two lateral edges 724 on opposite sides of the apex 722 that angle downwardly from the apex 722. Each pointed tip 720 also includes a backside 726 that angles downwardly from to the apex 722. The pointed tips 720 of the prongs 718 are used to puncture the wall 702 to form the hole 706 without the use of tools. When the bracket 700 is installed, the pointed tips 720 may contact the backside 708 of the wall 702 and limit the bracket 700 from pivoting in the hole 706. The width of the prong mount 704 may also be greater than the height of the hole 706, which also limits the bracket 700 from pivoting in the hole 706.

Each prong 718 includes a straight section 728 and a curved section 730. The straight section 728 engages the backside 708 of the wall 702 when the bracket 700 is installed on the wall 702. The curved section 730 may engage the top of the hole 706 near/at the backside 708 of the wall 702. The curved section 730 extends from a base plate 732. The base plate 732 defines a hole 734, and a terminal end 733 of the base plate includes a tab 735, both used to connect the prong mount 704 to the rod support arm 710.

The rod support arm 710 includes a first leg 736 and a second leg 738. The legs 736, 738 meet at elbow 740 at about a 90-degree angle. The first leg 736 includes a back surface 742 that engages a frontside 712 of the wall 702 to support the bracket 700 against pivoting in the hole 706 and damaging the wall 702 at the hole 706. The elbow 740 and the prong mount 704 meet at a front, bottom portion 746 of the hole 706. The second leg 738 extends under the base plate 732 of the prong mount 704 to support the rod support arm 710. The second leg 738 includes a threaded hole 748 that aligns with the hole 734 in the base plate 732. A screw 752 extends through the holes 734, 748 to secure the prong mount 704 and the rod support arm 710 together. The second leg 738 includes a second hole 744 that receives the tab 735 of the prong mount 704 to prevent rotation of the prong mount 704 relative to the rod support arm 710.

The first leg 736 of the rod support arm 710 also may include holes or slots 762, 764 so that the rod support arm 710 can be mounted without the prong mount 704. The holes 762, 764 may be used with fasteners, such as screws and/or nails, to attach the rod support arm 710 directly to a wall.

The cradle 716 includes a U-shaped configuration. A back segment 766 includes a threaded hole 768 that cooperates with a screw 770 that engages a curtain rod to hold the curtain rod in the cradle 716. The U-shaped configuration may be angled backward toward the wall 702, or may alternatively be angled upward or forward.

By way of example only, the prong mount 704 may have a width of 0.652 inches, a height of 0.700 inches and length of 1.626 inches. The curved portion 730 of the prong mount 704 may have a radius of curvature of 0.40 inches. The prongs 718 may have a length of 0.501 inches and a width of 0.120 inches. The distance from the terminal end 733 to the center of the hole 734 may be 0.738 inches. The rod support arm 710 may have a height of 1.60 inches taken along the first leg 736, a length of 2.251 inches measured from the first leg 736 to a center of the cradle 716 and a width of 0.652 inches. The cradle 716 may have a radius of curvature of 0.323 inches.

The prong mount 704 and the rod support arm 710 may be made from 0.063 inches thick steel.

Figure 8A:
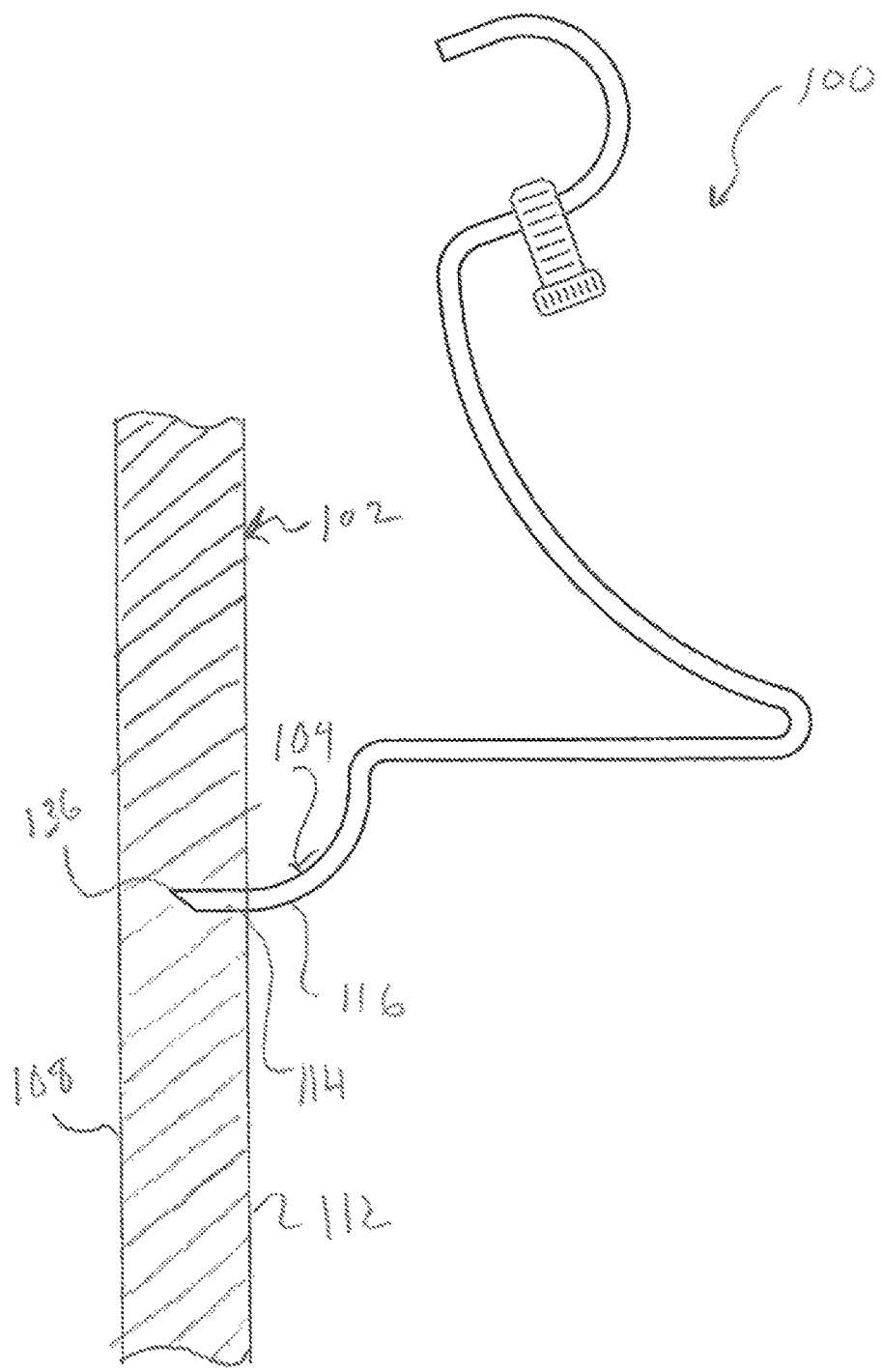
FIG. 8A is an illustration of the single piece rod bracket of FIG. 1 being inserted into a wall.
Figure 8B:
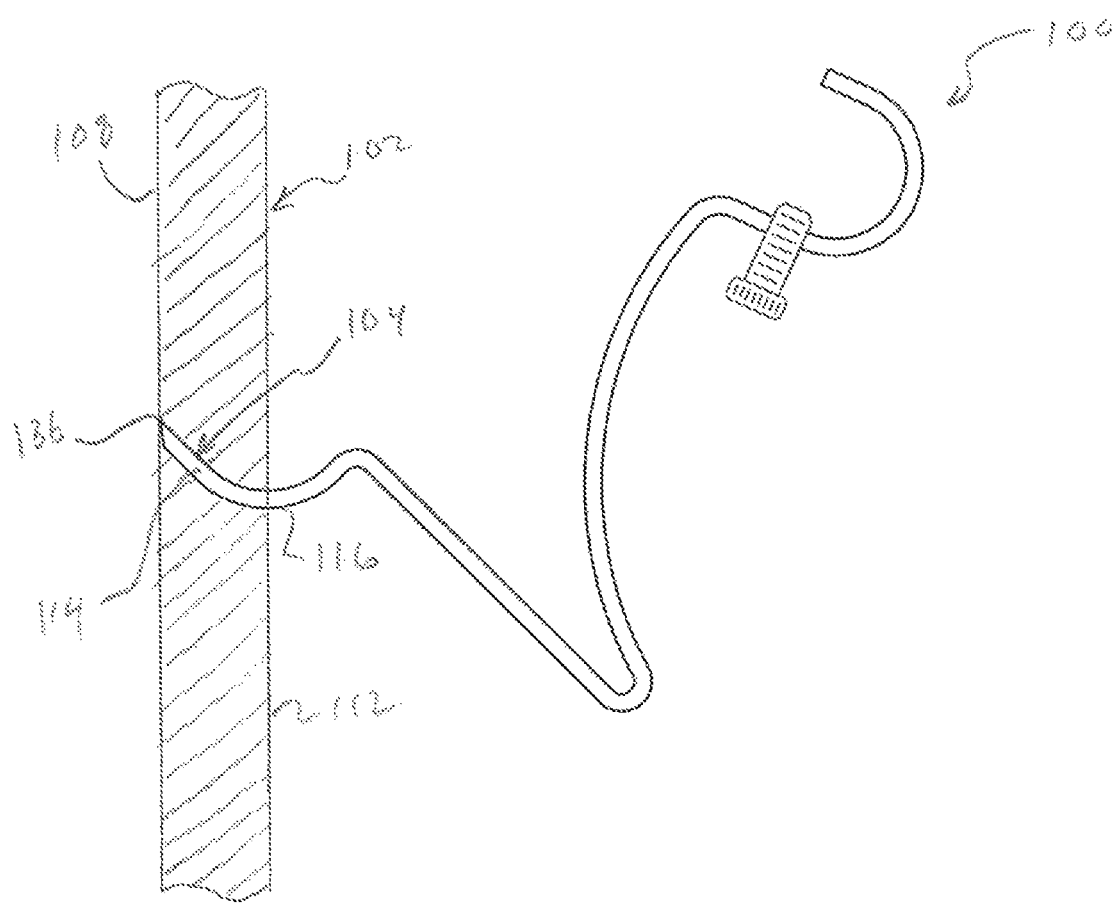
FIG. 8B is another illustration of the single piece rod bracket of FIG. 1 being inserted into the wall.
Figure 8C:
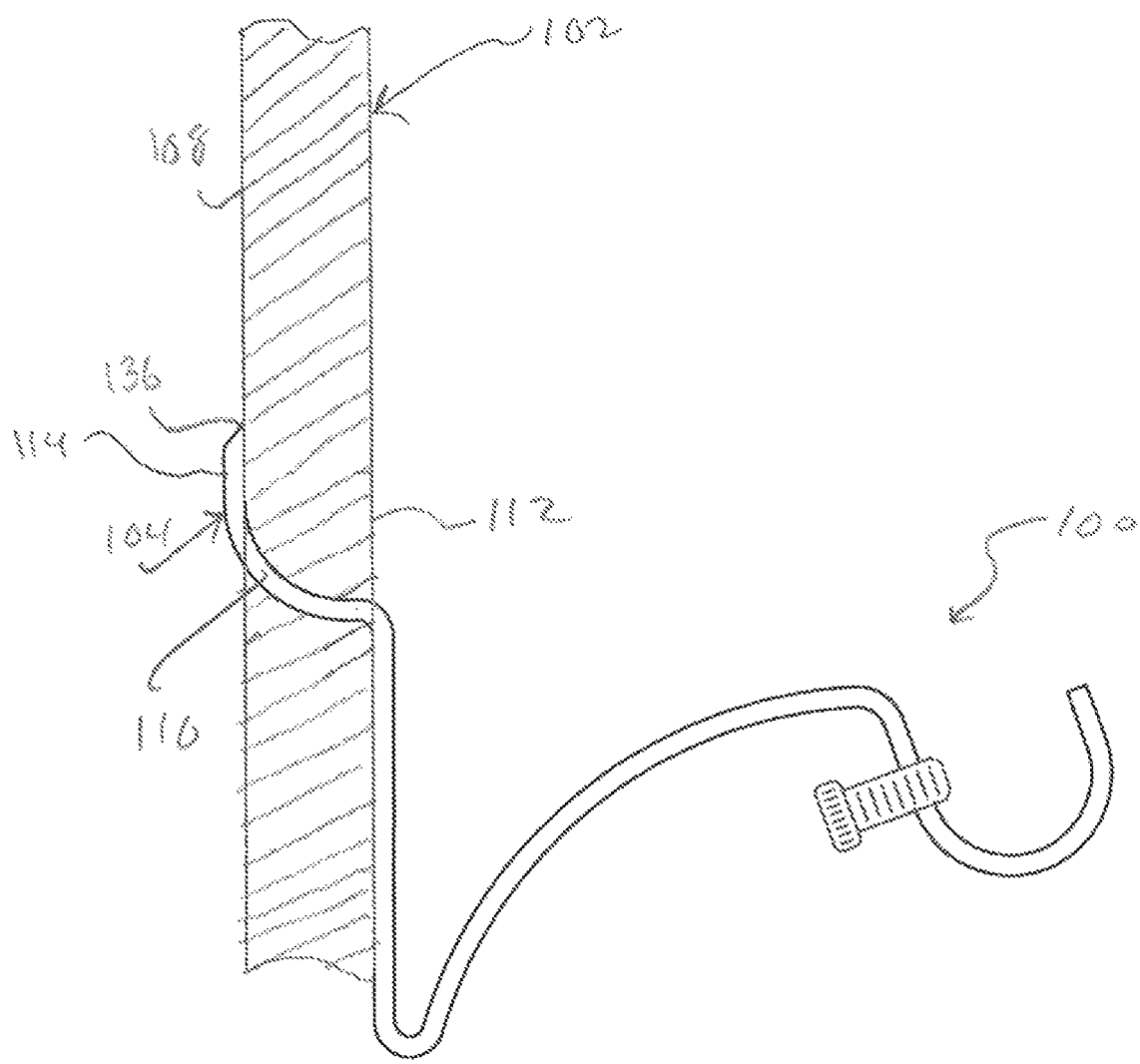
FIG. 8C is another illustration of the single piece rod bracket of FIG. 1 being inserted into the wall.

With reference to FIGS. 8A-B, there is illustrated the installation steps using the single piece bracket 10 as an example. First, the bracket 10 is oriented so that the straight portions 114 of the prongs 134 of the prong portion 104 are perpendicular with the frontside 112 of the wall 102. The pointed tips 136 of the straight portions 112 are pushed straight into the wall 102. When the curved portion 116 of the prongs 134 proceeds into the wall 102, the bracket 100 will turn toward the wall 102 as the prong portion 104 is continued to be pushed into the wall 102. Finally, when the leg portion 110 engages the frontside 112 of the wall 102, the straight portion 114 of the prongs 134 engage the backside 108 of the wall 102. This is when the bracket 100 is fully installed. This installation operation is the same for all the brackets (brackets 200, 300, 400, 500, 600, and 700) discussed above.

With reference to FIGS. 9A-9C, there is illustrated a mount portion 904 that includes a single prong 908 with a single tip 910. The mount portion 904 includes a mount base 912 defining a hole 914 for attaching to one of the above-described rod support arms. The tip 910 includes a point 916 and two angled sides 918. The prong 908 includes a curved segment 920 and a straight section 922. The single tip prong may be used with any of the above-described embodiments. The single tip is installed the same as that described above.

Regarding FIGS. 10A-10C, there is illustrated an alternative prong mount 1004. The prong mount 1004 has a generally U-shaped portion with two prongs 1018. Each prong 1018 includes a pointed tip 1020. Each pointed tip 1020 includes an apex 1022 and two lateral edges 1024A and 1024B on opposite sides of the apex 1024 that extend downwardly from the apex 322. The lateral edge 1024A is an extension of an outer edge 1019 of the prong 1018 and the lateral edge 1024B angles towards to the lateral edge 1024A. The lateral edges 1024A, 1024B are not symmetrical in that they form an asymmetrical pointed tip 1020.

When the bracket prong mount 1004 is used to install a bracket, the pointed tips 1020 may contact the backside of a wall and limit the bracket from pivoting in the hole of the wall. The width of the prong mount 1004 may also be greater than the height of the hole in the wall, which also limits the bracket from pivoting in the hole in the wall. The prongs 1018 may be used to penetrate the wall to form the hole in the wall without the use of tools.

Each prong 1018 includes a straight section 1028 and a curved section 1030. The straight section 1028 engages the backside of the wall when the bracket is installed on the wall. The curved section 1030 may engage the top of the hole in the wall near/at the backside of the wall. The curved section 1030 extends from a base plate 1032. The base plate 1032 defines a hole 1034 used to connect the prong mount 1004 to a bracket and/or the rod support arm.

The prong mount 1004 is like the prong mount 304 described above except for the asymmetrical pointed tip 1020. Further, the asymmetrical pointed tip 1020 may be used with any of the prong mounts and brackets described above.

The prong portion and mounts described above may be made using different process, most common are molding and stamping.

The matter set forth in the foregoing description and accompanying drawings is offered by way of illustration only and not as a limitation. While embodiments have been shown and described, it will be apparent to those skilled in the art that modifications may be made without departing from the broader aspects of the technological contribution. The actual scope of the protection sought is intended to be defined in the following claims.

What is claimed is:

1. A self-tapping curtain rod bracket comprising:
    a mount having at least two prongs spaced from one another, each prong having a pointed tip, the tips capable of penetrating a wall to form a hole for at least a portion of the mount to extend through the wall and engage a backside of the wall;
    a wall support associated with the mount and extending along and engaging a front side of the wall;
    an arm extending away from the wall support;
    a cradle portion being supported by the arm to hold a curtain rod; and
    the wall support includes an arm support, and the mount includes a mount portion, the mount portion being disposed between the arm support and the arm,
    wherein the at least two prongs each include a straight penetrating portion and a curved steering portion.

2. The self-tapping curtain rod bracket of claim 1 wherein the wall support and the arm are connected to one another.

3. The self-tapping curtain rod bracket of claim 1 wherein the mount portion is connected to the arm.

4. A self-tapping curtain rod bracket comprising:
    a mount having at least two prongs spaced from one another, each prong having a pointed tip, the tips capable of penetrating a wall to form a hole for at least a portion of the mount to extend through the wall and engage a backside of the wall;
    a wall support associated with the mount and extending along and engaging a front side of the wall;
    an arm extending away from the wall support;
    a cradle portion being supported by the arm to hold a curtain rod; and the wall support includes an arm support, and
    the mount includes a mount portion, the mount portion being disposed between the arm support and the arm,
    wherein the arm includes a first main portion and at least a first side portion extending away from and along at least a portion of the first main portion, the at least a first side portion resisting bending of the arm when the bracket is supporting a curtain rod.

5. The self-tapping curtain rod bracket of claim 4 wherein the wall support includes a second main portion and at least a second side portion extending away from and along at least a portion of the second main portion, the at least a second side portion resisting bending of the wall support when the bracket is supporting a curtain rod.

6. A self-tapping curtain rod bracket comprising:
    a mount having at least two prongs spaced from one another, each prong having a pointed tip, the tips capable of penetrating a wall to form a hole for at least a portion of the mount to extend through the wall and engage a backside of the wall;
    a wall support associated with the mount and extending along and engaging a front side of the wall;
    an arm extending away from the wall support;
    a cradle portion being supported by the arm to hold a curtain rod; and the wall support includes an arm support, and
    the mount includes a mount portion, the mount portion being disposed between the arm support and the arm,
    wherein the mount portion includes a pair of side portions forming a channel.

7. A self-tapping curtain rod bracket comprising:
    a mount having at least two prongs spaced from one another, each prong having a pointed tip, the tips capable of penetrating a wall to form a hole for at least a portion of the mount to extend through the wall and engage a backside of the wall;
    a wall support associated with the mount and extending along and engaging a front side of the wall;
    an arm extending away from the wall support; and
    a cradle portion being supported by the arm to hold a curtain rod; and
    the cradle portion includes a forward notch and a screw that enables holding a rod so that the rod does not contact a bottom surface of the cradle portion.

8. A self-tapping curtain rod bracket comprising:
    a mount having at least two prongs spaced from one another, each prong having a pointed tip, the tips capable of penetrating a wall to form a hole for at least a portion of the mount to extend through the wall and engage a backside of the wall;
    a wall support associated with the mount and extending along and engaging a front side of the wall;
    an arm extending away from the wall support;
    a cradle portion being supported by the arm to hold a curtain rod; and the wall support includes an arm support, and
    the mount includes a mount portion, the mount portion being disposed between the arm support and the arm,
    wherein the arm supports two cradle portions.

9. The self-tapping curtain rod bracket of claim 1 wherein the mount, the wall support, the arm and the cradle portion are more than one piece.

10. A self-tapping curtain rod bracket comprising:
    a mount having at least one prong, the at least one prong having a pointed tip, the tip capable of penetrating a wall to form a hole for at least a portion of the mount to extend through the wall and engage a backside of the wall;
    a wall support removably mounted to the mount and extending along and engaging a front side of the wall;
    an arm extending away from the wall support;

a cradle portion being supported by the arm to hold a curtain rod;

the mount includes a mount portion configured to attach to the arm;

the mount portion defines a first hole, and the arm defines a second hole; and a screw that extends through the first hole and second hole to connect the mount portion to the arm.

11. The self-tapping curtain rod bracket of claim 10 wherein the cradle portion is removably attached to the arm.

12. The self-tapping curtain rod bracket of claim 10 wherein the mount portion includes a projection, the arm defines a third hole, and the third hole receives the projection when the mount portion is mounted to the arm.

* * * * *